(12) United States Patent
Yanagi et al.

(10) Patent No.: US 7,895,292 B2
(45) Date of Patent: Feb. 22, 2011

(54) INFORMATION MANAGEMENT SYSTEM, INFORMATION PROCESSING DEVICE, AND COMPUTER USABLE MEDIUM

(75) Inventors: Satoru Yanagi, Nagoya (JP); Kazushige Muroi, Nagoya (JP); Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1183 days.

(21) Appl. No.: 11/527,420

(22) Filed: Sep. 27, 2006

(65) Prior Publication Data

US 2007/0079346 A1 Apr. 5, 2007

(30) Foreign Application Priority Data

Sep. 30, 2005 (JP) ............................. P2005-288537

(51) Int. Cl.
*G06F 15/16* (2006.01)
*G06F 15/173* (2006.01)
*G06F 17/30* (2006.01)

(52) U.S. Cl. ...................... 709/218; 709/224; 709/227; 707/827

(58) Field of Classification Search ................. 709/218, 709/225, 224, 227; 707/827
See application file for complete search history.

(56) References Cited

U.S. PATENT DOCUMENTS

| | | | | |
|---|---|---|---|---|
| 5,361,134 A | * | 11/1994 | Hu et al. ..................... | 358/296 |
| 5,361,173 A | * | 11/1994 | Ishii et al. ..................... | 360/27 |
| 5,610,980 A | * | 3/1997 | Johnson et al. ............ | 713/189 |
| 5,813,009 A | * | 9/1998 | Johnson et al. ............ | 707/695 |
| 5,864,679 A | * | 1/1999 | Kanai et al. .................. | 709/238 |
| 6,119,117 A | * | 9/2000 | Yoda et al. ................... | 715/200 |
| 6,219,768 B1 | * | 4/2001 | Hirabayashi et al. ........ | 711/154 |
| 2002/0059227 A1 | * | 5/2002 | Narahara ....................... | 707/6 |
| 2002/0114001 A1 | * | 8/2002 | Oyanagi .................... | 358/1.15 |
| 2003/0110132 A1 | * | 6/2003 | Sako ........................ | 705/51 |
| 2006/0221383 A1 | * | 10/2006 | Katsurabayashi .......... | 358/1.15 |

FOREIGN PATENT DOCUMENTS

| | | |
|---|---|---|
| JP | 2000-315203 | 11/2000 |
| JP | 2001-92847 | 4/2001 |
| JP | 2004-32085 | 1/2004 |
| JP | 2004-40520 | 2/2004 |
| JP | 2004-348685 | 12/2004 |

OTHER PUBLICATIONS

Japanese Office Action, with partial English translation, issued in Japanese Patent Application No. JP 2005-288537, mailed Jun. 3, 2008.

* cited by examiner

*Primary Examiner*—Larry Donaghue
(74) *Attorney, Agent, or Firm*—Baker Botts L.L.P.

(57) ABSTRACT

When a first period in which communication is performed by a first interactive communication unit and a second period in which utilization data is utilized have a period overlapping with each other, the utilization data are correlated with interactive communication content data, which are contents interactively delivered in the first period, by a correlation giving unit. When interactive communication is performed by the first interactive communication unit, the previous interactive communication content data are searched out using information on an interactive communication partner of the interactive communication as a search condition, thereby outputting the interactive communication content data and the utilization data correlated with the interactive communication content data by the correlation giving unit.

10 Claims, 24 Drawing Sheets

FIG. 2

| ID | START TIME | END TIME | STATUS ID | DESTINATION ADDRESS | TARGET DOCUMENT ADDRESS | AMOUNT |
|---|---|---|---|---|---|---|
| sid1 | 20xx/xx/xx xx:xx:xx | 20xx/xx/xx xx:xx:xx | PRN | | file://**//* | 1 |
| sid2 | 20xx/xx/xx xx:xx:xx | 20xx/xx/xx xx:xx:xx | FXT | 05x-xxx-xxxx | file://**//* | |
| sid3 | 20xx/xx/xx xx:xx:xx | 20xx/xx/xx xx:xx:xx | PRN | | http://**//* | 2 |
| sid4 | 20xx/xx/xx xx:xx:xx | 20xx/xx/xx xx:xx:xx | BKX | 4-xxxx-xxxx-x | http://**//* | 30 |

FIG. 3

| STATUS | STATUS ID | GID | DESTINATION ADDRESS | TARGET DOCUMENT ADDRESS | AMOUNT |
|---|---|---|---|---|---|
| PC PRINT | PRN | 1 | NONE | ADDRESS OF PRINTED DOCUMENT | NUMBER OF COPIES |
| PC FAX TRANSMISSION | FPT | 2 | DESTINATION FAX NUMBER | ADDRESS OF TRANSMITTED DOCUMENT | NONE |
| PC FAX RECEPTION | FPR | 2 | SOURCE FAX NUMBER | ADDRESS OF RECEIVED DOCUMENT | NONE |
| SCAN-TO-PC | SCN | 0 | NONE | ADDRESS OF SCANNED IMAGE | NONE |
| SCAN-TO-MEDIA | SCM | 0 | NONE | ADDRESS OF SCANNED IMAGE (COPIED TO PC) | NONE |
| SCAN-TO-MAIL | SML | 2 | DESTINATION MAIL ADDRESS | ADDRESS OF TRANSMITTED IMAGE (COPIED TO PC) | NONE |
| FAX TRANSMISSION | FXT | 2 | FAX NUMBER OF DESTINATION | ADDRESS OF TRANSMITTED IMAGE (COPIED TO PC) | NONE |
| FAX RECEPTION | FXR | 2 | SOURCE FAX NUMBER | ADDRESS OF RECEIVED IMAGE (COPIED TO PC) | NONE |
| COPY | CPY | 0 | NONE | ADDRESS OF COPIED IMAGE (COPIED TO PC) | NUMBER OF COPIES |
| EMISSION OF TELEPHONE CALL | TLT | 2 | DESTINATION TELEPHONE NUMBER | ADDRESS OF COMMUNICATION SOUND (COPIED TO PC) | COMMUNICATION TIME |
| RECEPTION OF TELEPHONE CALL | TLR | 2 | TELEPHONE NUMBER OF SOURCE | ADDRESS OF COMMUNICATION SOUND (COPIED TO PC) | COMMUNICATION TIME |
| MEDIA PRINT | PRM | 0 | NONE | ADDRESS OF PRINTED IMAGE (COPIED TO PC) | NUMBER OF COPIES |
| BOOK | BKX | 2 | ISBN | ADDRESS OF BOOK INTRODUCING HP (SEARCHED) | TIME (MINUTE) |

FIG. 4

| ID | TIME | DOCUMENT ADDRESS | EVENT | APPLICATION | OPERATOR |
|---|---|---|---|---|---|
| did1 | 20xx/xx/xx xx:xx:xx | file://**/**/d1 | create | MULTIFUNCTION MACHINE A | user2 |
| did2 | 20xx/xx/xx xx:xx:xx | file://**/**/d2 | open | EDITOR | user1 |
| did3 | 20xx/xx/xx xx:xx:xx | file://**/**/d2 | update | EDITOR | user1 |
| did4 | 20xx/xx/xx xx:xx:xx | file://**/**/d1 | open | VIEWER | user2 |
| did5 | 20xx/xx/xx xx:xx:xx | file://**/**/d2 | print | EDITOR | user1 |
| did6 | 20xx/xx/xx xx:xx:xx | file://**/**/d3 | open | MAILER | user1 |
| did7 | 20xx/xx/xx xx:xx:xx | file://**/**/d3 | send | MAILER | user1 |
| did8 | 20xx/xx/xx xx:xx:xx | file://**/**/d2 | close | EDITOR | user1 |

FIG. 5

| ID | REGISTRATION TIME | PAPER FILE ID | DOCUMENT ADDRESS |
|---|---|---|---|
| pid1 | 20xx/xx/xx xx:xx:xx | xxx1 | file://###/###/### |
| pid2 | 20xx/xx/xx xx:xx:xx | xxx2 | file://###/###/### |
| pid3 | 20xx/xx/xx xx:xx:xx | xxx1 | file://###/###/### |

FIG. 6

| DEVICE TYPE | DEVICE ID |
|---|---|
| MULTIFUNCTION MACHINE | MULTIFUNCTION MACHINE ID1 |
| BOOK SENSOR | BOOK SENSOR ID2 |
| PAPER FILE READER | PAPER FILE READER ID3 |

FIG. 10A

THIS DOCUMENT IS PREVIOUSLY PRINTED IN 200x/xx/xx xx:xx:xx
CHECK # * * * * FILE

FIG. 10B

THIS DOCUMENT IS PREVIOUSLY PRINTED IN 200x/xx/xx xx:xx:xx

FIG. 10C

THIS DOCUMENT IS PREVIOUSLY TRANSMITTED TO ○○ IN
200x/xx/xx xx:xx:xx

FIG. 17

| | ADDRESS | TIME | REFERENCE NUMBER | |
|---|---|---|---|---|
| ○ | file://###/###/## | 20xx/xx/xx xx:xx:xx | xx | |
| ○ | file://###/###/## | 20xx/xx/xx xx:xx:xx | xx | |
| ● | file://###/###/## | 20xx/xx/xx xx:xx:xx | xx | |

TELEPHONE COMMUNICATION WITH THIS DESTINATION PARTY WAS PREVIOUSLY PERFORMED 1701 points to first row.

Buttons: DISPLAY (1703), PRINT (1705), CLOSE (1707)

FIG. 18

THE FOLLOWING DOCUMENTS WERE OPEND WHEN TELEPHONE COMMUNICATION WITH THIS DESTINATION PARTY WAS PREVIOUSLY PERFORMED

| | ADDRESS | TIME | REFERENCE NUMBER | |
|---|---|---|---|---|
| ● | file://###/###/## | 20xx/xx/xx xx:xx:xx | xx | |
| ○ | file://###/###/## | 20xx/xx/xx xx:xx:xx | xx | |
| ○ | file://###/###/## | 20xx/xx/xx xx:xx:xx | xx | |

1801 points to first row.

Buttons: DISPLAY (1803), PRINT (1805), CLOSE (1807)

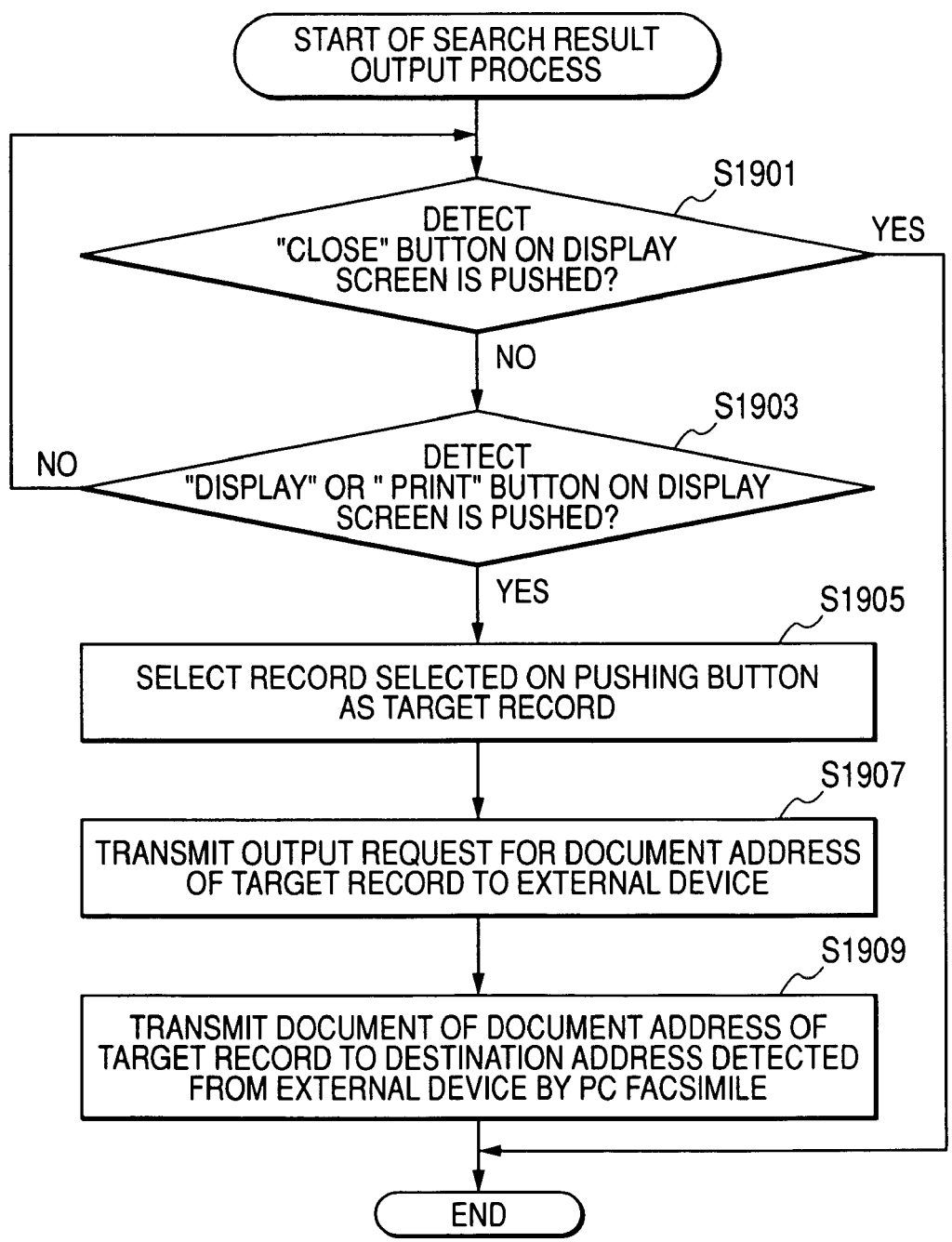

INFORMATION MANAGEMENT SYSTEM, INFORMATION PROCESSING DEVICE, AND COMPUTER USABLE MEDIUM

CROSS REFERENCE TO RELATED APPLICATION

This application claims priority from Japanese Patent Application No. 2005-288537 filed Sep. 30, 2005, the contents of which are hereby incorporated by reference into the present application.

TECHNICAL FIELD

Aspects of the present invention relate to an information management system for managing a plurality of information pieces or data as a management target, an information processing device provided in the information management system, and a program associated with the information processing device.

BACKGROUND

In recent years, personal computers (hereinafter, referred to as "PC") have been widely spread and used for a personal purpose or on business. For example, a PC is connected to an external device serving as an information input source or an external device for performing an operation based on a command from the PC in a communication-practicable manner. Specifically, the PC is supplied with a large amount of data from the external devices and the information is used and managed by the PC, while the processes based on the managed information are performed to the external devices. In the environment in which it is difficult to install a plurality of external devices corresponding to the processes, a so-called multifunction machine having a plurality of units that execute a plurality of functions is connected to the PC.

The PC and the external devices transmit and receive a large amount of information therebetween in association with operations of the external devices, and the large amount of information is managed by the PC (for example, see JP-A-2004-32085).

In the PC for managing a large amount of data, there have been suggested techniques of correlating data with each other so as to enhance the efficiency of works using the data to be managed.

For example, there is known an information management system which can perform the correlating operation by allowing a message requesting for an instruction of correlating conditions to be displayed and allowing a user to give an instruction in response to the display, so as to correlate the data to be written with other data at the time of writing data (for example, see JP-A-2000-315203).

SUMMARY

Aspects of the present invention provide an information management system which can manage data having a correlation by using interactive communication partner information indicating an interactive communication partner as a key, an information processing device provided in the information management system, and a program for performing a predetermined operation to the information processing device.

BRIEF DESCRIPTION OF THE DRAWINGS

FIG. 2 is a diagram illustrating a status table according to an illustrative aspect of the invention;

FIG. 3 is a diagram illustrating definitions of items stored in the status table according to a first illustrative aspect of the invention;

FIG. 4 is a diagram illustrating a document table according to an illustrative aspect of the invention;

FIG. 5 is a diagram illustrating a file information table according to an illustrative aspect of the invention;

FIG. 6 is a diagram illustrating a device designating table according to an illustrative aspect of the invention;

FIGS. 10A, 10B, and 10C are diagrams illustrating a display format resulting from the before-activation intellectual assistance process according to the invention;

FIG. 17 is a diagram illustrating a display format (associated with the status table) of a search result in the during-activation intellectual assistance process according to an illustrative aspect of the invention;

FIG. 18 is a diagram illustrating a display format (associated with the document table) of a search result in the during-activation intellectual assistance process according to an illustrative aspect of the invention;

FIG. 19 is a diagram illustrating a flow of a search result output process according to an illustrative aspect of the invention;

DETAILED DESCRIPTION

General Overview

Figure 1:
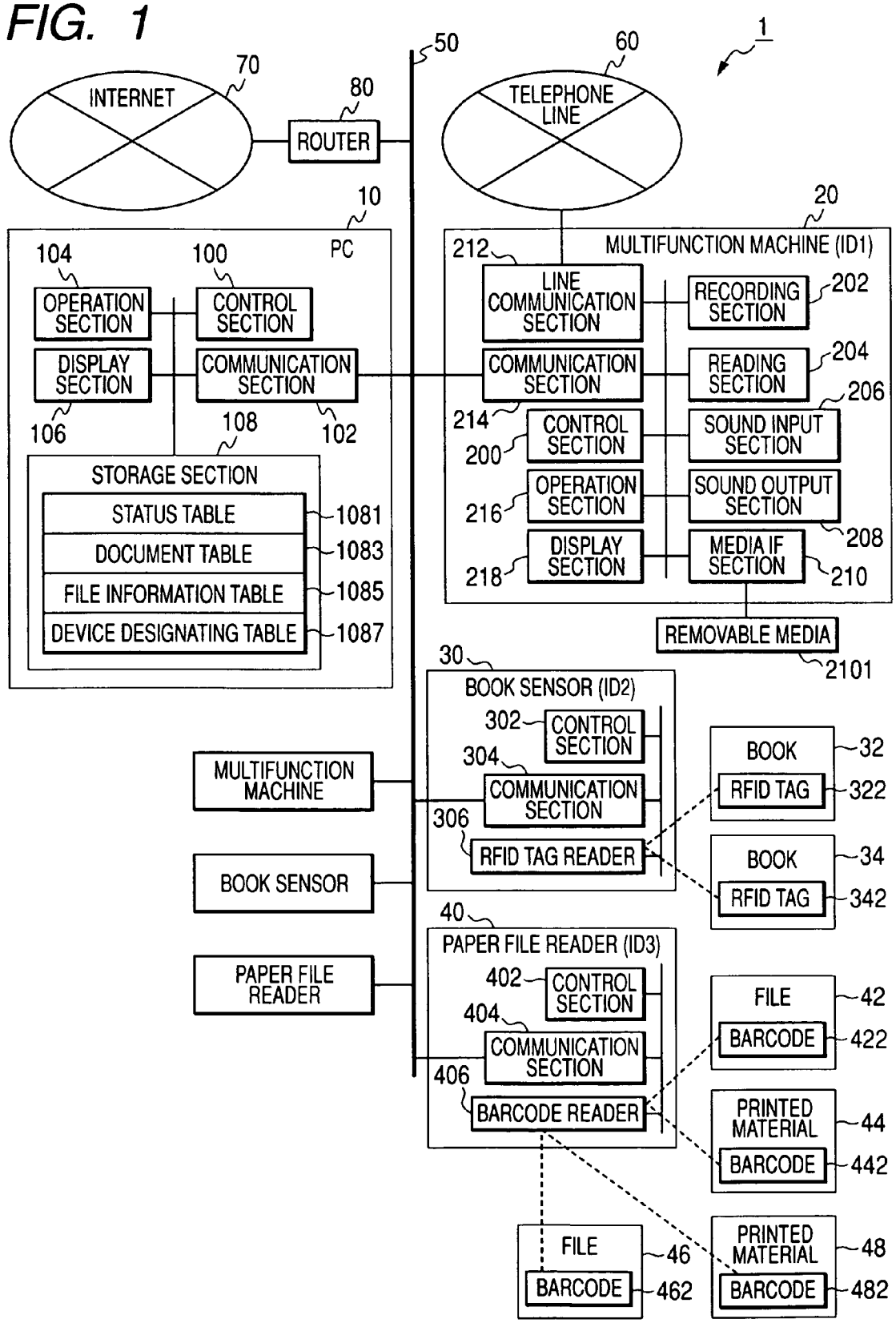
FIG. 1 is a diagram illustrating a configuration of an information management system according to an illustrative aspect of the present invention.

According to an aspect of the invention, there is provided an information management system comprising: a first external device having a first interactive communication unit which can perform interactive communication and interchange of interactive communication partner information with a second external device having a second interactive communication unit through a telecommunication line; a first information processing device which is connected to the first external device in a communication-practicable manner and has a first output unit; and a third storage unit that stores utilization data which can be accessed by the first information processing device. Here, the first information processing device comprises: a first detection unit that detects a first period in which interactive communication is performed by the first interactive communication unit, the interactive communication partner information, and interactive communication content data are contents of the interactive communication; a storage control unit that stores the interactive communication content data detected by the first detection unit as the utilization data in the third storage unit; a first specification unit that specifies interactive-communication-content-data specifying information for specifying the interactive communication content data; a first storage unit that correlates and stores the first period and the interactive communication partner information detected by the first detection unit and the interactive-communication-content-data specifying information; a utilization unit that utilizes the utilization data stored in the third storage unit; a second detection unit that detects a second period in which the utilization data are utilized by the utilization unit; a second specification unit that specifies utilization-data specifying information for specifying the utilization data which are utilized in the second period; a second storage unit that correlates and stores the second period and the utilization-data specifying information; a correlation giving unit that gives a correlation to the utilization data specified by the utilization-data specifying information correlated with the second period the interactive communication content data specified by the interactive-communication-content-data specifying information correlated with the first period to be correlated with each other, when the first period and the second period have a period overlapping with each other; an extraction unit that extracts the same interactive communication-partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device. The first external device comprises an offer unit that offers the first period, the interactive communication partner information, and the interactive communication content data in a manner that the first information processing device can detect when the interactive communication is performed by the first interactive communication unit.

As a result, the period when the first period as an interactive communication period and the second period in which the utilization data are utilized overlap with each other can be used as a correlating target period. As a result, the utilization data having been prepared, updated, stored, printed, or the like during the interactive communication can be correlated with the interactive communication content data of the interactive communication. In addition, the previous interactive communication contents with the interactive communication partner and the utilization data correlated with the interactive communication contents can be searched out and output using the interactive communication partner information as a key on condition that the interactive communication starts.

The "period" of the first period and the second period includes factors of time points.

The first storage unit and the second storage unit may not be two different tables, and may be composed of one storage unit if only it can specify items constituting records of the tables.

The interactive communication partner information is information such as a phone number for specifying the interactive communication partner.

According to another aspect of the invention, it is possible to obtain an information management system which can manage data correlated with the interactive communication of the interactive communication unit by interactive communication partners. Since the correlated data can be shared with the interactive communication partner, it is possible to smoothly perform the interaction with the communication partner. In addition, since the output of the correlated data is performed on condition that the interactive communication is performed, a user need not search for and output the correlated data, thereby reducing a work burden of the user. Accordingly, the communication time and the communication cost are not wasted. Since it is not necessary to wait for the search of the correlated data, the interactive communication partner is not allowed to feel unpleasant.

According to still another aspect of the present invention, when a first period in which communication is performed by a first interactive communication unit and a second period in which utilization data is utilized have a period overlapping with each other, the utilization data are correlated with interactive communication content data, which are contents interactively delivered in the first period, by a correlation giving unit. When interactive communication is performed by the first interactive communication unit, the previous interactive communication content data are searched out using information on an interactive communication partner of the interactive communication as a search condition, thereby outputting the interactive communication content data and the utilization data correlated with the interactive communication content data by the correlation giving unit.

According to still another aspect of the invention, there is provided an information management system comprising: a first external device having a first interactive communication unit which can perform interactive communication and interchange of interactive communication partner information with a second external device having a second interactive communication unit through a telecommunication line; a first information processing device which is connected to the first external device in a communication-practicable manner and has a first output unit; and a third storage unit that stores utilization data which can be accessed by the first information processing device. Here, the first information processing device comprises: a first detection unit that detects a first period in which interactive communication is performed by the first interactive communication unit, the interactive communication partner information, and interactive communication content data are contents of the interactive communication; a storage control unit that stores the interactive communication content data detected by the first detection unit as the utilization data in the third storage unit; a first specification unit that specifies interactive-communication-content-data specifying information for specifying the interactive communication content data; a first storage unit that correlates and stores the first period and the interactive communication partner information detected by the first detection unit and the interactive-communication-content-data specifying information; a utilization unit that utilizes the utilization data stored in the third storage unit; a second detection unit that detects a second period in which the utilization data are utilized by the utilization unit; a second specification unit that specifies utilization-data specifying information for specifying the utilization data which are utilized in the second period; a second storage unit that correlates and stores the second period and the utilization-data specifying information; a correlation giving unit that gives a correlation to the utilization data specified by the utilization-data specifying information correlated with the second period and the interactive communication content data specified by the interactive-communication-content-data specifying information correlated with the first period to be correlated with each other, when a third period obtained by adding a predetermined period from the end of the first period to the first period overlaps with the second period at least; an extraction unit that extracts the same interactive communication partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device. The first external device comprises an offer unit that offers the first period, the interactive communication partner information, and the interactive communication content data in a manner that the first information processing device can detect when the interactive communication is performed by the first interactive communication unit.

Accordingly, by preparing a third period, which is obtained by adding a predetermined period from the end of the first period to the first period which is an interactive communication period, the period when the third period and the second period in which the utilization data are utilized overlap with each other can be used as a correlating target period. That is, it is possible to prepare a period in which the data utilized within a predetermined period after the interactive communication ends can be considered as data correlated with the interactive communication. As a result, it is possible to correlate the interactive communication contents of the interactive communication with the information such as the information or the assigned schedule, which was a topic during the interactive communication, necessary for the interactive communication, after the interactive communication as well as during the interactive communication. In addition, the previous interactive communication contents with the interactive communication partner and the utilization data correlated with the interactive communication contents can be searched out and output using the interactive communication partner information as a key on condition that the interactive communication starts.

According to still another aspect of the invention, it is possible to obtain an information management system which can manage data correlated with the interactive communication of the interactive communication unit by interactive communication partners. Since the correlated data can be shared with the interactive communication partner, it is possible to smoothly perform the interaction with the communication partner. In addition, since the output of the correlated data is performed on condition that the interactive communication is performed, a user need not search for and output the correlated data, thereby reducing a work burden of the user. Accordingly, the communication time and the communication cost are not wasted. Since it is not necessary to wait for the search of the correlated data, the interactive communication partner is not allowed to feel unpleasant.

An information management system according to still another aspect of the invention is the information management system, wherein the second external device is connected to a second information processing device having a second output unit, which can communicate with the first information processing device through the telecommunication line, in a communication-practicable manner, and wherein the output control unit of the first information processing device can output the utilization data to at least one of the first output unit, the first external device, the second external device, and the second output unit.

Accordingly, it is possible to output the correlated information to the second output unit of the information processing device of the interactive communication partner.

According to still another aspect of the invention, since the search result can be output to the second output unit of the interactive communication partner, the interactive communication partner can perform a variety of processes such as opening, storage, and additional recording to the data correlated with the interactive communication.

An information management system according to still another aspect of the invention is the information management system, wherein the output control unit of the first information processing device outputs the utilization data outputs address information which can access the utilization data and outputs the utilization data indicated by an address selected from the address information.

Accordingly, it is possible to easily select and output the correlated data.

According to still another aspect of the invention, since only the information to be output can be selectively output, it is possible to prevent unnecessary data from being transmitted and output.

According to still another aspect of the invention, there is provided an information processing device which is connected to a first external device in a communication-practicable manner and which can access a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that the information processing device can detect when the interactive communication is performed by the first interactive communication unit, the information processing device comprising: a first detection unit that detects a first period in which interactive communication is performed by the first interactive communication unit, the interactive communication partner information, and interactive communication content data are contents of the interactive communication; a storage control unit that stores the interactive communication content data detected by the first detection unit as the utilization data in the third storage unit; a first specification unit that specifies interactive-communication-content-data specifying information for specifying the interactive communication content data; a first storage unit that correlates and stores the first period and the interactive communication partner information detected by the first detection unit and the interactive-communication-content-data specifying information; a utilization unit that utilizes the utilization data stored in the third storage unit; a second detection unit that detects a second period in which the utilization data are utilized by the utilization unit; a second specification unit that specifies utilization-data specifying information for specifying the utilization data which are utilized in the second period; a second storage unit that correlates and stores the second period and the utilization-data specifying information; a correlation giving unit that gives a correlation to the utilization data specified by the utilization-data specifying information correlated with the second period the interactive communication content data specified by the interactive-communication-content-data specifying information correlated with the first period to be correlated with each other, when the first period and the second period have a period overlapping with each other; an extraction unit that extracts the same interactive communication partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device.

As a result, the period when the first period as an interactive communication period and the second period in which the utilization data are utilized overlap with each other can be used as a correlating target period. As a result, the utilization data having been prepared, updated, stored, printed, or the like during the interactive communication can be correlated with the interactive communication content data of the interactive communication. In addition, the previous interactive communication contents with the interactive communication partner and the utilization data correlated with the interactive communication contents can be searched out and output using the interactive communication partner information as a key on condition that the interactive communication starts.

According to still another aspect of the invention, it is possible to obtain an information processing device which can construct the information management system.

According to still another aspect of the invention, there is provided a computer usable medium having computer readable instructions readable by a computer which is connected to a first external device in a communication-practicable manner and which can access a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that a first information processing device can detect when the interactive communication is performed by the first interactive communication unit, the computer readable instructions enabling the computer to serves as: a first detection unit that detects a first period in which interactive communication is performed by the first interactive communication unit, the interactive communication partner information, and interactive communication content data are contents of the interactive communication; a storage control unit that stores the interactive communication content data detected by the first detection unit as the utilization data in the third storage unit; a first specification unit that specifies interactive-communication-content-data specifying information for specifying the interactive communication content data; a first storage unit that correlates and stores the first period and the interactive communication partner information detected by the first detection unit and the interactive-communication-content-data specifying information; a utilization unit that utilizes the utilization data stored in the third storage unit; a second detection unit that detects a second period in which the utilization data are utilized by the utilization unit; a second specification unit that specifies utilization-data specifying information for specifying the utilization data which are utilized in the second period; a second storage unit that correlates and stores the second period and the utilization-data specifying information; a correlation giving unit that gives a correlation to the utilization data specified by the utilization-data specifying information correlated with the second period the interactive communication content data specified by the interactive-communication-content-data specifying information correlated with the first period to be correlated with each other, when the first period and the second period have a period overlapping with each other; an extraction unit that extracts the same interactive communication partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device.

As a result, the period when the first period as an interactive communication period and the second period in which the utilization data are utilized overlap with each other can be used as a correlating target period. As a result, the utilization data having been prepared, updated, stored, printed, or the like during the interactive communication can be correlated with the interactive communication content data of the interactive communication. In addition, the previous interactive communication contents with the interactive communication partner and the utilization data correlated with the interactive communication contents can be searched out and output using the interactive communication partner information as a key on condition that the interactive communication starts.

According to still another aspect of the invention, it is possible to obtain a program which can serve as the information processing device.

According to still another aspect of the invention, there is provided an information processing device which is connected to a first external device in a communication-practicable manner and which can access a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that the information processing device can detect when the interactive communication is performed by the first interactive communication unit, the information processing device comprising: a first detection unit that detects a first period in which interactive communication is performed by the first interactive communication unit, the interactive communication partner information, and interactive communication content data are contents of the interactive communication; a storage control unit that stores the interactive communication content data detected by the first detection unit as the utilization data in the third storage unit; a first specification unit that specifies interactive-communication-content-data specifying information for specifying the interactive communication content data; a first storage unit that correlates and stores the first period and the interactive communication partner information detected by the first detection unit and the interactive-communication-content-data specifying information; a utilization unit that utilizes the utilization data stored in the third storage unit; a second detection unit that detects a second period in which the utilization data are utilized by the utilization unit; a second specification unit that specifies utilization-data specifying information for specifying the utilization data which are utilized in the second period; a second storage unit that correlates and stores the second period and the utilization-data specifying information; a correlation giving unit that gives a correlation to the utilization data specified by the utilization-data specifying information correlated with the second period and the interactive communication content data specified by the interactive-communication-content-data specifying information correlated with the first period to be correlated with each other, when a third period obtained by adding a predetermined period from the end of the first period to the first period overlaps with the second period at least; an extraction unit that extracts the same interactive communication partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device.

Accordingly, by preparing a third period, which is obtained by adding a predetermined period from the end of the first period to the first period which is an interactive communication period, the period when the third period and the second period in which the utilization data are utilized overlap with each other can be used as a correlating target period. That is, it is possible to prepare a period in which the data utilized within a predetermined period after the interactive communication ends can be considered as data correlated with the interactive communication. As a result, it is possible to correlate the interactive communication contents of the interactive communication with the information such as the information or the assigned schedule, which was a topic during the interactive communication, necessary for the interactive communication, after the interactive communication as well as during the interactive communication. In addition, the previous interactive communication contents with the interactive communication partner and the utilization data correlated with the interactive communication contents can be searched out and output using the interactive communication partner information as a key on condition that the interactive communication starts.

According to still another aspect of the invention, it is possible to obtain an information processing device which can construct the information management system.

According to still another aspect of the invention, there is provided a computer-readable program which is connected to a first external device in a communication-practicable manner and which can access a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that the information processing device can detect when the interactive communication is performed by the first interactive communication unit, the computer-readable program allowing a computer to serve as: a first detection unit that detects a first period in which interactive communication is performed by the first interactive communication unit, the interactive communication partner information, and interactive communication content data are contents of the interactive communication; a storage control unit that stores the interactive communication content data detected by the first detection unit as the utilization data in the third storage unit; a first specification unit that specifies interactive-communication-content-data specifying information for specifying the interactive communication content data; a first storage unit that correlates and stores the first period and the interactive communication partner information detected by the first detection unit and the interactive-communication-content-data specifying information; a utilization unit that utilizes the utilization data stored in the third storage unit; a second detection unit that detects a second period in which the utilization data are utilized by the utilization unit; a second specification unit that specifies utilization-data specifying information for specifying the utilization data which are utilized in the second period; a second storage unit that correlates and stores the second period and the utilization-data specifying information; a correlation giving unit that gives a correlation to the utilization data specified by the utilization-data specifying information correlated with the second period and the interactive communication content data specified by the interactive-communication-content-data specifying information correlated with the first period to be correlated with each other, when a third period obtained by adding a predetermined period from the end of the first period to the first period overlaps with the second period at least; an extraction unit that extracts the same interactive communication partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device.

Accordingly, by preparing a third period, which is obtained by adding a predetermined period from the end of the first period to the first period which is an interactive communication period, the period when the third period and the second period in which the utilization data are utilized overlap with each other can be used as a correlating target period. That is, it is possible to prepare a period in which the data utilized within a predetermined period after the interactive communication ends can be considered as data correlated with the interactive communication. As a result, it is possible to correlate the interactive communication contents of the interactive communication with the information such as the information or the assigned schedule, which was a topic during the interactive communication, necessary for the interactive communication, after the interactive communication as well as during the interactive communication. In addition, the previous interactive communication contents with the interactive communication partner and the utilization data correlated with the interactive communication contents can be searched out and output using the interactive communication partner information as a key on condition that the interactive communication starts.

According to still another aspect of the invention, it is possible to obtain a program which can serve as the information processing device.

First Example

Hereinafter, a specific information management system according to an illustrative aspect of the invention will be described with reference to the drawings. The invention is not limited to the configuration described below, but may employ a variety of configurations within the same technical spirit.

(Configuration of Information Management System)

FIG. 1 is a diagram illustrating an information management system. As can be seen from the figure, the information management system 1 comprises a PC 10 as an information processing device comprising an information management function, a multifunction machine 20 as an external device for performing a variety of functions, a book sensor 30 as an external device for sensing books 32 and 34 as a management target of the PC 10, and a paper file reading section 40 as an external device for sensing paper files 42 and 46, which are stationery for filing paper as a management target of the PC 10, and printed materials 44 and 48. The devices are all connected to each other through a network line 50.

The PC 10 comprises a CPU, a ROM, and a RAM (not shown), and further comprises a control section 100 for controlling operations of the PC 10 (the entire PC 10) on the basis of programs stored in the ROM, a communication section 102, which is connected to the network line 50 so as to control the network line 50, an operation section 104 for receiving instructions from a user of the PC 10, a display section 106 for displaying a variety of information, and a storage section 108 comprising a hard disk or the like.

The storage section 108 comprises a status table 1081, a document table 1083, a file information table 1085, and a device designating table 1087. Details of the tables will be described later.

The multifunction machine 20 comprises a CPU, a ROM, and a RAM (not shown), and further comprises a control section 200 for controlling operations of the multifunction machine 20 (the entire multifunction machine 20), a recording section 202 as an image forming unit, a reading section 204 as an image reading unit, a sound input section 206 as a microphone, a sound output section 208 as a speaker, and a media IF section 210 fitted with a removable media 2101. The multifunction machine further comprises a line communication section, which is connected to a telephone line 60 so as to control the telephone line 60, a communication section 214, which is connected to the network line 50 so as to control the network line 50, an operation section 216 for receiving instructions from a user of the multifunction machine 20, and a display section 218 for displaying a variety of information.

A device ID (multifunction machine ID 1) indicating that it is a device constituting the information management system 1 is given to the multifunction machine 20.

The book sensor 30 comprises a CPU, a ROM, and a RAM (not shown), and further comprises a control section 302 for controlling operations of the book sensor 30 (the entire book sensor 30), a communication section 304, which is connected to the network line 50 so as to control the network line 50, and a radio-frequency (RF) ID tag reading section 306 for reading information of RFID tags 322 and 324 given to books 32 and 34.

The book sensor 30 serves as a device for storing information indicating what book is in a user's hands at what times (is being read or is ready to be read). That is, when the RFID tag read 306 is activated on the basis of the program stored in the ROM of the control section 302 and a response is read from the RFID tag 332 or 342 of the books 32 and 34, the identification information on the RFID tag 332 or 342 and the present time (start time) are temporarily stored in the RAM of the control section 302. Then, when the response read from the RFID tags 332 or 342 ends, the identification information on the RFID tag 332 or 342 and the start time temporarily stored in the RAM of the control section 302 and the present time (end time) are transmitted to the PC 10 through the communication section 304. The PC 10 stores the information in the statue table 1081.

A device ID (book sensor ID 2) indicating that it is a device constituting the information management system 1 is given to the book sensor 30.

The paper file reading section 40 comprises a CPU, a ROM, and a RAM (not shown), and further comprises a control section 402 for controlling operations of the paper file reading section 40 (the entire paper file reading section 40), a communication section 404 connected to the network line 50 so as to control the network line 50, and a barcode reading section 406 for reading barcodes 422, 442, 462, and 482 given to the paper files 42 and 46 or the printed materials 44 and 48. The paper file reading section 40 serves as an input section for forming information, which is used to correspond the paper files 42 and 46 with the printed materials 44 and 48 filed in the paper files, in a file information table 1085. That is, the paper file reading section inputs the barcodes of the paper files through the barcode reading section 406 on the basis of a program stored in a ROM of the control section 402, and then inputs the barcodes of the printed materials, in which the barcodes are temporarily stored in a RAM of the control section 402. The input data temporarily stored are transmitted to the PC 10 through the communication section 404. The PC 10 receives the information and adds the received information to the status table 1081 and the file information table 1085.

A device ID (paper file reading section ID 3) indicating that it is a device constituting the information management system 1 is given to the paper file reading section 40.

Now, information stored in the status table 1081, the document table 1083, the file information table 1085, and the device designating table 1087, which are all stored in the storage section 108 of the PC 10, will be described.

As shown in FIG. 2, the status table 1081 stores a processing operation (status ID) executed by an execution unit of the multifunction machine 20, start and end times of the processing operation (wherein it can be properly determined what time is set to the start time or the end time), information indicating a location of a document which is a target of the processing operation (hereinafter, referred to as "target document"), an destination address for specifying a specific opposite party when the processing operation is performed to the specific opposite party, and an amount of the target document which is a target of the processing operation, as one record every time when the processing operation is performed. A unique ID for identifying the processing operation is given to each processing operation.

The status ID stored in the status table 1081 is defined as shown in FIG. 3. For example, when the PC 10 performs a print job using the recording section 202 of the multifunction machine 20 (this case is defined as a status "PC print" in FIG. 3), the status ID is set to "PRN", the destination address is set to "None", the target document address is set to "Address of printed document", and the amount is set to "Number of copies."

Since the PC print operation is performed between the PC 10 and the multifunction machine 20, the destination address is is set to "None." Since the document as a target of the processing operation is stored in the storage section 108 of the PC 10, an address of the storage section 108 storing the target document or an address of a homepage (hereinafter, referred to as "HP") when the target document is a specific HP is stored as the target document address. The amount is set to the "Number of sheets." For example, when a sheet of target document is printed, the amount is "one copy."

When a facsimile (hereinafter, referred to as "fax") transmission is performed using the reading section 204 and the line communication section 212 of the multifunction machine 20 (this case is defined as a status "fax transmission" in FIG. 3), the status ID is set to "FXT", the destination address is set to "Destination FAX number", the target document address is set to "Address of transmitted image (copied to PC)", and the amount is set to "None."

Since the fax transmission is performed between the multifunction machine 20 and a different facsimile machine, the destination address is set to "Destination FAX number." In the information management system 1, when the fax transmission is performed, the transmitted image as a target of the fax transmission is stored in the storage section 108 of the PC 10. Accordingly, an address in the storage section 108 in which the transmitted image is stored (an address of the transmitted image (copied to the PC)) is defined as the "Target document address" (in the process (status) defined as "(copied to the PC)" in the target document address in FIG. 3, an address in the storage section 108 in which an image or sound is stored as a processing target as described above is defined as the target document address.).

In case of emission of a telephone call using the sound input unit 206, the sound output unit 208, and the line communication unit 212 of the multifunction machine 20 (which is defined as a status "Emission of telephone call" in FIG. 3), the status ID is set to "TLT", the destination address is set to "Call destination telephone number", the target document address is set to "Address of data obtained by converting communication sound (copied to PC) into a sound text", and the amount is set to "Communication time."

Since the emission of a telephone call is performed with respect to a communication device different from the multifunction machine 20, the destination address is set to "Call destination telephone number." In the information management system 1, when a telephone call is emitted, data obtained by converting the communication sound into the sound text by the use of the controller 100 are stored in the storage unit 108 of the PC 10. Accordingly, an address in the storage unit 108 in which the data converted to the text is defined as the "Target document address."

In case of reception of a telephone call (defined as a status "Reception of telephone call" in FIG. 3), the status ID is set to "TLR", the destination address is set to "Call source telephone number", the target document address is set to "Address of data obtained by converting communication sound (copied to PC) into a sound text", and the amount is set to "Communication time."

Since the reception of a telephone call is performed with respect to a communication device different from the multifunction machine 20 similarly to the emission of a telephone call, the destination address is set to "Call source telephone number." In the information management system 1, when a telephone call is received, data obtained by converting the communication sound into the sound text by the use of the controller 100 are stored in the storage unit 108 of the PC 10. Accordingly, an address in the storage unit 108 in which the data converted to the text is defined as the "Target document address."

When the books 32 and 34 managed by the PC 10 are used (this case is defined as a status "Book" in FIG. 3), the status ID is set to "BKX", the destination address is set to "Japanese book code (hereinafter, referred to "ISBN")", the target document address is "Book introducing HP address (searched)", and the amount is set to "time (minute)."

ISBN used as the destination address serves to identify the books 32 and 34 and is stored in RFID tags 322 and 342. The address of the HP introducing the books 32 and 34 is provided for a general purpose and is defined as the address stored as the target document address. The amount is set to the time (minute) for using the books 32 and 34.

In addition to those described above, "PC fax transmission (the pc transmits image data and destination to the multifunction machine 20 through the communication section 102 and the multifunction machine 20 fax transmits received image data through the line communication section 212)", "PC fax reception (the line communication section 212 of the multifunction machine 20 transmits the received image data to the PC 10 through the communication section 214 and the PC 10 stores the received image data", "Scan-to-PC (the multifunction machine 20 transmits the image data scanned by the reading section 204 to the PC 10 through the communication section 214 and the PC stores the received image data)", "Scan-to-media (the image data scanned by the reading section 204 are stored in the removable media 2101 through a media interface (hereinafter, referred to as "media IF") section 210)", "Scan-to-mail (the image data scanned by the reading section 204 are transmitted through the communication section 214)", "Fax reception (the image data received by the line communication section 212 are printed by the recording section 202)", "Copy (the image data read by the reading section 204 are printed by the recording section 202)", "Telephone transmission", "Telephone reception", and "Media print (the image data or the document data stored in the removable media 2101 are printed by the recording section 202) are defined respectively.

The paper file ID used as the destination address serves to identify the paper files 42 and 46 or the printed materials 44 and 48 and are given as barcodes to the paper files 42 and 46 or the printed materials 44 and 48. The address stored as the target document address is set to an address in the storage section 108 storing the document data constituting the documents or printed materials 44 and 48 filed in the paper files 42 and 46.

"GID (Group ID)" defined in FIG. 3 is an individual ID given to respective groups into which the respective processing operations (statuses) are divided. Specifically, GID "2" is given to the processing operation of which the destination address is stored, but "0" and "1" are given to the processing operations of which the destination address is set to "None." GID "1" is given to a processing operation (only "PC print" in the illustrative aspect) using target document data previously stored in the storage section 108, and GID "0" is given to a processing operation of which target document data are stored by performing the processing operation.

The document table 1083 stores a work or instruction performed to a document. Here, as shown in FIG. 4, an ID is given to a time when the work or the like is performed (wherein it can be properly determined what time the work or the like is performed), information indicating a location of the document, a work or the like (event) performed to the document, a device performing the work or the like (operating application), and a user carrying out the work.

Data treated in the document table 1083 comprise the document data, image data, and sound data.

Here, as a work (event) performed to a document, "create", "open", "update", "print", "send", and "close" are defined. More specifically describing the events, when a new document is prepared, for example, when a document is prepared by a manipulation of the operation section 104 of the PC 10, when a document is scanned or copied by the use of the reading section 204 of the multifunction machine 20, the document is received in fax or in PC fax by the use of the line communication section 212, or when a communication sound is stored through telephone transmission or telephone reception using the line communication section 212, "create" is stored as an event in the document table 1083.

When the document data, the image data, or the sound data stored in the storage section 108 of the PC are opened by the use of the operation section 104 and when an HP is opened by the use of the operation section 104, "open" is stored as an event in the document table 1083. When the document data or the like are closed, "close" is stored.

When the document data, the image data, or the sound data previously stored in the storage section 108 are updated by an editor stored in the PC 10, "update" is stored as an event in the document table 1083.

When the document data or the image data previously stored in the storage section 108 are printed by the editor, "print" is stored as an event in the document table 1083.

When the document data, the image data, or the sound data previously stored in the storage section 108 are transmitted by a mail transmitting and receiving application stored in the PC 10, or when the document data or the image data previously stored in the storage section 108 are transmitted through the PC fax transmission or the fax transmission of the multifunction machine 20, "send" is stored as an event in the document table 1083.

In the document table 1083, one of the above-mentioned items is stored as a record every time when a work is performed to a document, like in the status table 1081.

Here, the status table 1081 and the document table 1083 need not be two tables different from each other, but may be one table if only the items constituting the records of the tables can be specified.

As shown in FIG. 5, a unique ID for identifying a record, a time when the record is written, a paper file ID for identifying the paper files 42 and 46, and a document address for specifying the printed materials 44 and 48 filed in the paper files 42 and 46 are stored as a record in the file information table 1085.

The paper file ID serves to identify the paper files 42 and 46 and is written in barcodes 442 and 462. The document address stored as the target document address serves to correlate the paper files 42 and 46 with the printed materials 44 and 48 filed therein and denotes an address of an electronic document resulting in the printed materials 44 and 48. That is, when the electronic document resulting in the printed materials 44 and 48 is stored in the storage section 108 of the PC 10, the address in the storage section 108 storing the electronic document is stored as the document address, or when the electronic document is an HP, the address of the HP is stored as the document address. The information is written to the barcodes 442 and 448 recorded in the printed materials 44 and 46.

When a plurality of multifunction machines 20, the book sensor 30, and the paper file reading section are connected to the network line 50, the device designating table 1087 is a table, which specifies and stores a target of the information management system 1 among the multifunction machines 20 and the like. The device designating table comprises the structure shown in FIG. 6.

(Process 1 of Information Management System)

Next, process (1) of the information management system illustrated as above will be described with reference to the figures.

Figure 7:
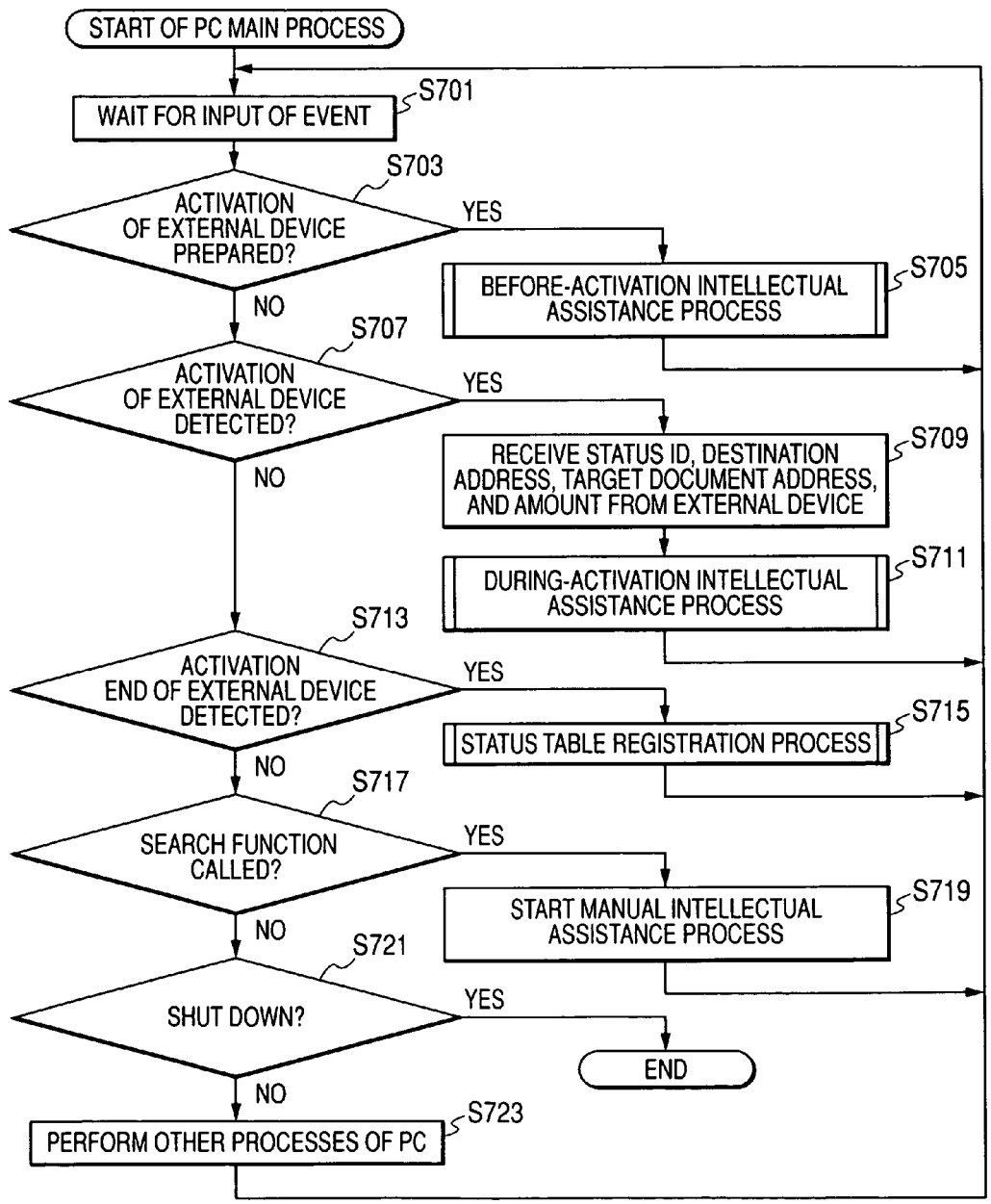
FIG. 7 is a diagram illustrating a flow of a main process performed by a PC according to an illustrative aspect of the invention.

FIG. 7 is a diagram illustrating a flow of a main process performed by the PC 10. The process shown in the flow is performed by the control section 100 of the PC 10, and more specifically, the CPU of the control section 10 performs the process by the use of a program stored in the ROM or the like.

First, the control section 100 waits until an instruction for performing any one process is input through the operation section 104 of the PC 10 or the communication section 102 from a designated external device shown in FIG. 6, such as the multifunction machine 20, the book sensor 30, and the paper file reading section 40 (step 701).

Thereafter, when it is detected in step 701 that an instruction is given, the process is specified. That is, when an instruction is input to the control section 100 first determines whether the instruction is an instruction for activating a printer driver controlling the recording section 202 of the multifunction machine 20 or an instruction for preparing for activation of the external device such as activation of a multifunction machine utility for using the reading section 204 of the multifunction machine 20 (step 703).

When it is determined in step 703 that the input instruction is to prepare for the activation of the external device (step 703: YES), the control section 100 of the PC 10 performs a before-activation intellectual assistance process to be described later and waits until an instruction for performing a process is input (step 701).

The before-activation intellectual assistance process means a process of alarming a user having given the instruction so as to prevent the redundant printing when an instruction for printing the specified document data is given to the recording section 202 of the multifunction machine 20 from the PC 10 but the process of printing the document is previously performed within a predetermined time. The before-activation intellectual assistance process comprises a process of alarming a user having given a fax transmission instruction so as to prevent the redundant fax transmission when the fax transmission instruction for transmitting specific document data to a specific counter party is given to the line communication section 212 of the multifunction machine 20 from the PC 10 but the document data are previously transmitted to the counter party.

On the other hand, when the input instruction is not to prepare for the activation of the external device (step 703: NO), it is determined whether the instruction detected in step 701 is an instruction from one of the multifunction machine 20, the book sensor 30, and the paper file reading section 40 designated in FIG. 6 and an instruction for detecting the activation of the external device (step 707).

When it is determined in step 707 that the instruction is an instruction for detecting the activation of the external device (step 707: YES), the control section 100 receives the information defined in FIG. 3, that is, the status ID, the destination address, the target document address, and the amount, from the external device (step 709). The status ID and the like are stored in the RAM of the control section 100.

Then, the control section performs a during-activation intellectual assistance process (step 711) and then waits until an instruction for performing another process is input when the process is finished (step 701).

The during-activation intellectual assistance process means a process for providing the information used until that time as information associated with a present work when a process corresponding to the same instruction as the instruction from the external device was performed in the past.

When the input instruction is not to prepare for the activation of the external device (step 707: NO), it is determined whether the instruction detected in step 701 is to detect the end of the detected activation of the external device (step 713).

When it is determined in step 707 that the instruction is to detect the end of the activation of the external device (step 713: YES), the control section 100 performs a status-table registration process to be described later (step 715) and then waits until an instruction for performing another process is input when the status-table registration process is finished (step 701).

When the input instruction is not to end the activation of the external device (step 713: NO), it is determined whether the instruction detected in step 701 is to call a search function (step 717).

When it is determined in step 717 that the input instruction is to call a search function (step 717: YES), the control section performs a manual intellectual assistance process to be described later (step 719) and then waits until an instruction for performing another process is input when the manual intellectual assistance process is finished (step S701).

The manual intellectual assistance process is to provide a user with information associated with a user' present work in response to a condition designated by the user.

When the input instruction is not the manual intellectual assistance process (step 717: NO), it is determined whether the instruction detected in step 701 is to shut down the PC 10 (step 721). When the instruction is to shut down the PC 10 (step 721: YES), the PC 10 is shut off. When the instruction is not to shut down the PC (step 721: NO), a process corresponding to the instruction is performed (step 723). After performing the process, the control section waits until an instruction for performing another process is input (step 701).

(Before-Activation Intellectual Assistance Process)

Figure 8:
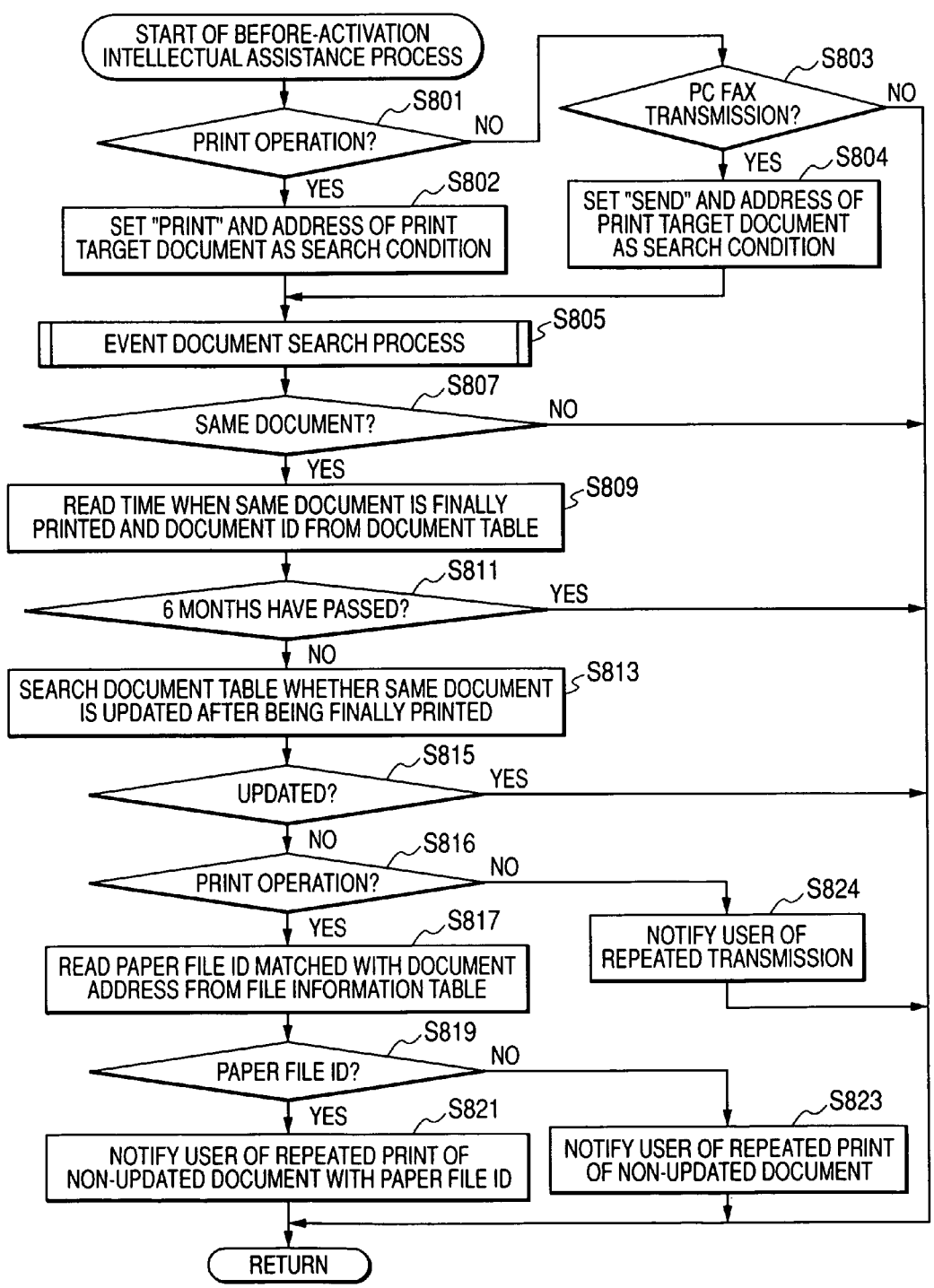
FIG. 8 is a diagram illustrating a flow of a before-activation intellectual assistance process according to an illustrative aspect of the invention.

FIG. 8 is a diagram illustrating a flow of a before-activation intellectual assistance process.

When the before-activation intellectual assistance process is performed in step 705, it is first determined whether the input instruction for preparing for the activation of the external device is a printing instruction to the recording section 202 (step 801). When the input instruction is the printing instruction (step 801: YES), step 802 is performed. On the other hand, when the input instruction is not the printing instruction (step 801: NO), it is determined whether the input instruction for preparing for the activation of the external device is a PC fax transmission instruction to the line transmission section 212 (step 803). When the input illustration is the fax transmission instruction (step 803: YES), the process proceeds to step 804. When the input instruction is not the PC fax transmission instruction (step 803: NO), the control section ends the before-activation intellectual assistance process and waits again in step 701 until an instruction for performing another process is input.

In step 802, in order to confirm whether the same document data as the document data to be printed exist in the previously printed documents, that is, in the documents of which the event is stored as "print" in the document table shown in FIG. 4, the event "print" and the address of the document data to be printed are set as search conditions and an event document search process is performed on the basis of the two search conditions (step 805).

In step 804, in order to confirm whether the same document data as the document data to be transmitted in a PC fax manner and a record of transmission to the same designation exist in the previously transmitted documents, that is, in the documents of which the event is stored as "send" in the document table shown in FIG. 4, the event "send", the destination address (fax number) of the PC fax transmission, and the address of the document data to be transmitted are set as search conditions and the event document search process is performed on the basis of the two search conditions (step 805).

Figure 9:
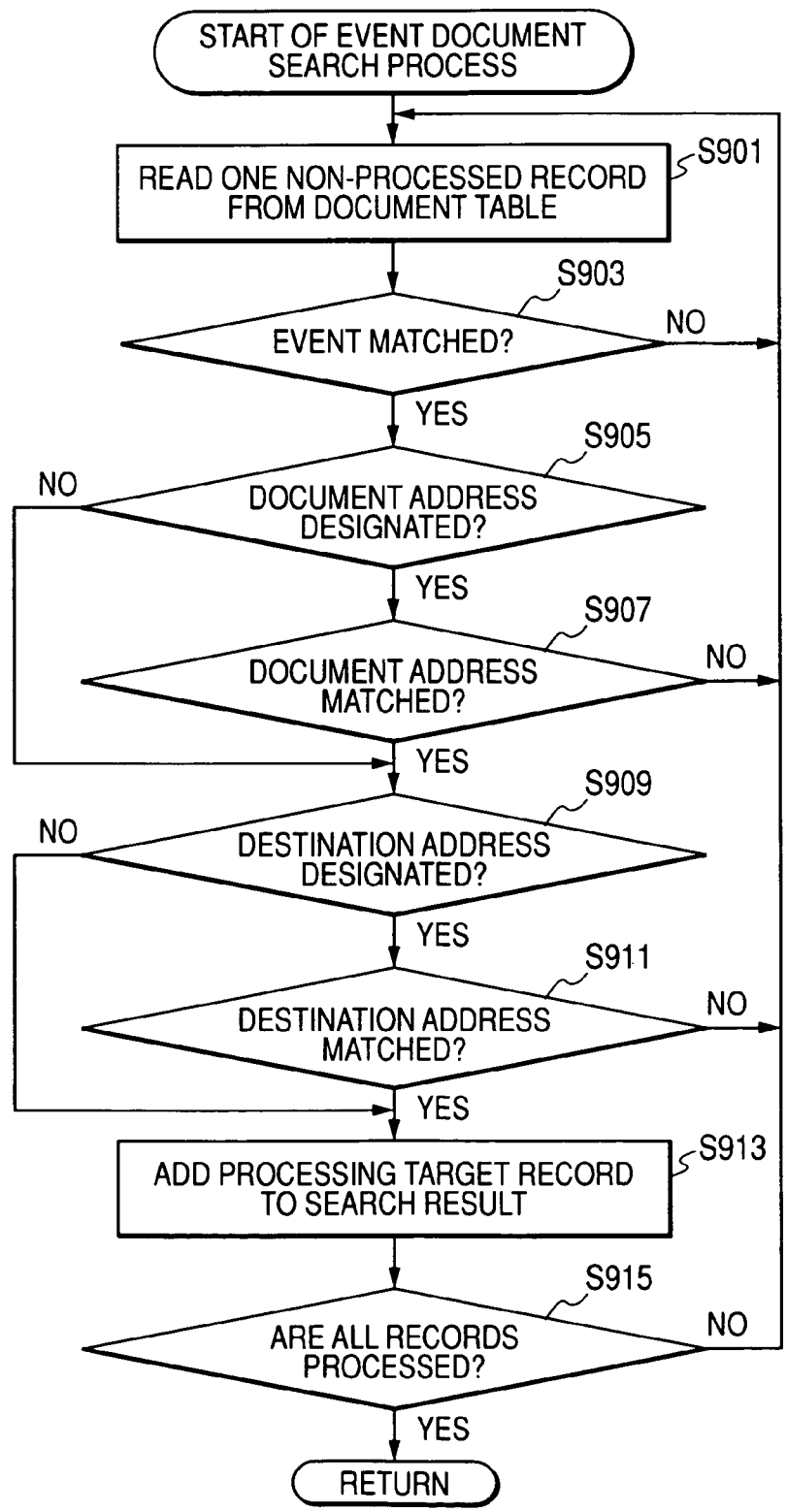
FIG. 9 is a diagram illustrating a flow of an event document search process according to an illustrative aspect of the invention.

FIG. 9 is a diagram illustrating a flow of the event document search process. When the process starts, the control section 100 first reads one record, to which the process is not performed yet, from a document database 1083 (step 901). Then, the control section determines whether an event of the record to be processed is matched with the event "print" ("send") set as the search condition in step 802 (or step 804) (step 903). Here, when the event of the record to be processed is not "print" ("send") (step 903: NO), the record is excluded from the processing target and the process of step 901 is performed again.

On the other hand, when the event of the record to be processed is "print" ("send") (step 903: YES), the control section determines whether the document address is set as the search condition of step 802 (or step 804) (step 905).

When it is determined in step 905 that the document address is set as the search condition of step 802 (or step 804) (step 905: YES), it is determined whether the document address of the record to be processed is matched with the document address designated as the search condition (step 907). When it is determined that the document addresses are matched with each other (step 907: YES), the process of step 909 is performed. When it is determined that the document addresses are not matched with each other (step 907: NO), the process of step 901 is performed again.

When it is determined in step 905 that the document address is not set as the search condition (step 905: NO), the process of step 907 is not performed, but the process of step 909 is performed.

When it is determined in step 909 that the destination address is set as the search condition of step 802 (or step 804) (that is, step 909: YES, when step 804 is performed), it is determined whether the destination address of the record to be processed is matched with the destination address designated as the search condition (step 911). When it is determined that the destination addresses are matched with each other (step 911: YES), the process of step 913 is performed. When it is determined that the destination addresses are not matched with each other (step 911: NO), the process of step 901 is performed.

When it is determined in step 909 that the destination address is not set as the search condition (that is, step 909: NO, when step 802 is performed), the process of step 911 is not performed, but the process of step 913 is performed.

When it is not determined in step 911 whether the destination addresses are matched with each other (step 905: NO or step 907: YES and step 909: NO), or when it is determined in step 911 that the destination addresses are matched with each other (step 905: NO or step 907: YES, step 909: YES, and step 911: YES), it is considered that the document data set as the search condition are previously printed or the document data set as the search condition are previously transmitted to the same designation, and thus the record to be processed is added to the search result (step 913).

Thereafter, it is determined in step 915 whether the event document search process has been performed to all the records of the document table. When the process has not been performed to all the records (step 915: NO), the process of step 901 is performed again. When the process has been performed to all the records (step 915: YES), the event document search process is finished and the process of step 807 is performed.

In step 807, it is determined whether the same document exists through the event document search process of step 805. Here, when it is determined that the same document does not exist (step 807: NO), the document data to be processed are not printed or transmitted to the same designation. Accordingly, the control section does not perform the subsequent processes (that is, performs the print or transmission process), but waits until the next input is performed.

On the contrary, when the same document exists (step 807: YES), the ID and time associated with the latest record (finally printed or transmitted) are read from the records, which determined to be identical (step 809) and it is then determined whether the time passes 6 months from the present time (step 811).

When it is determined that the time passes 6 months (step 811: YES), the document data to be processed are redundantly printed or transmitted to the same designation. However, since a considerable time has passed from the final print or transmission, the control section does not perform the subsequent processes (that is, performs the print or transmission process), but waits again in step 701 until the next input is performed.

On the contrary, when it is determined that the time does not pass 6 months (step 811: NO), it is determined from the document table (see FIG. 4) whether the same document is updated (event "update") after finally printed (event "print") or transmitted (event "send") (step 813).

When it is determined in step 815 that the same document is updated (step 815: YES), the control section performs the print or transmission process and then waits in step 701 until the next input is performed. On the other hand, when it is determined that the same document is not updated (step 815: NO), the type of manipulation is determined. When the manipulation indicates a print process (step 816: YES), the paper file ID corresponding to the document address is read from the file information table 1085 (step 817) so as to determine whether the previously printed document is managed in the file information table 1085 (see FIG. 5) along with the paper file ID thereof.

When it is determined in step 817 that the corresponding paper file ID exists in the file information table 1085, it is notified to the user in the manner shown in FIG. 10A that this print job is to redundantly print the non-updated document with the paper file ID (step 821).

On the other hand, when the corresponding paper file ID does not exist in the file information table 1085, it is notified to the user in the manner shown in FIG. 10B that the non-updated document is redundantly printed (step 823).

When the manipulation indicates a PC fax transmission (step 816: NO), it is notified to the user in the manner shown in FIG. 10C that the same document is transmitted to the same designation (step 824).

(During-Activation Intellectual Assistance Process)

Figure 11:
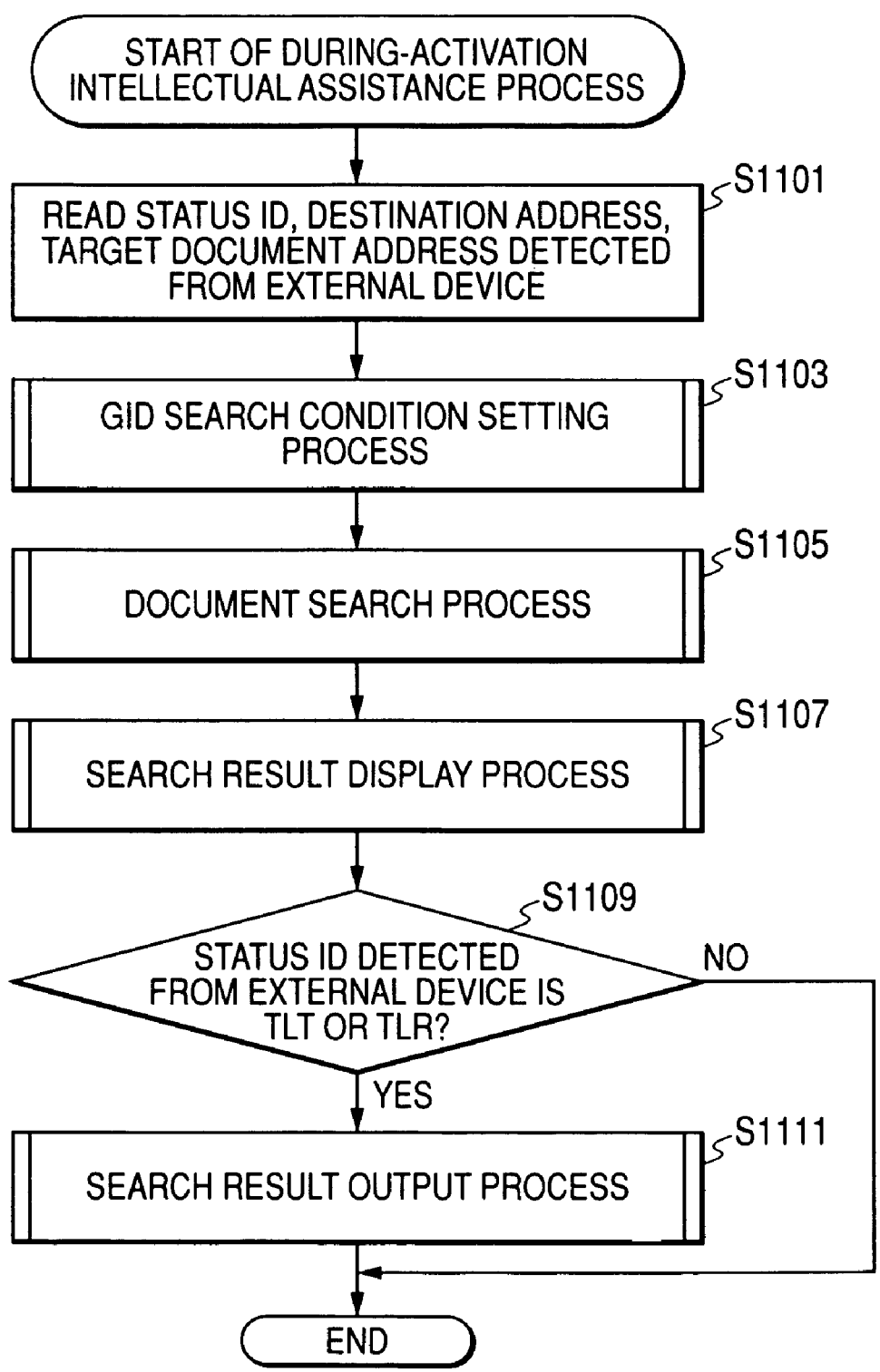
FIG. 11 is a diagram illustrating a flow of a during-activation intellectual assistance process according to the first illustrative aspect of the invention.

FIG. 11 is a diagram illustrating a flow of a during-activation intellectual assistance process.

In step 711, when the during-activation intellectual assistance process is performed, the control section 100 of the PC 10 first reads the status ID, the destination address, and the target document address input (detected) from the external device in step 709 (step 1101) and performs a GID search condition setting process (step 1103).

Figure 12:
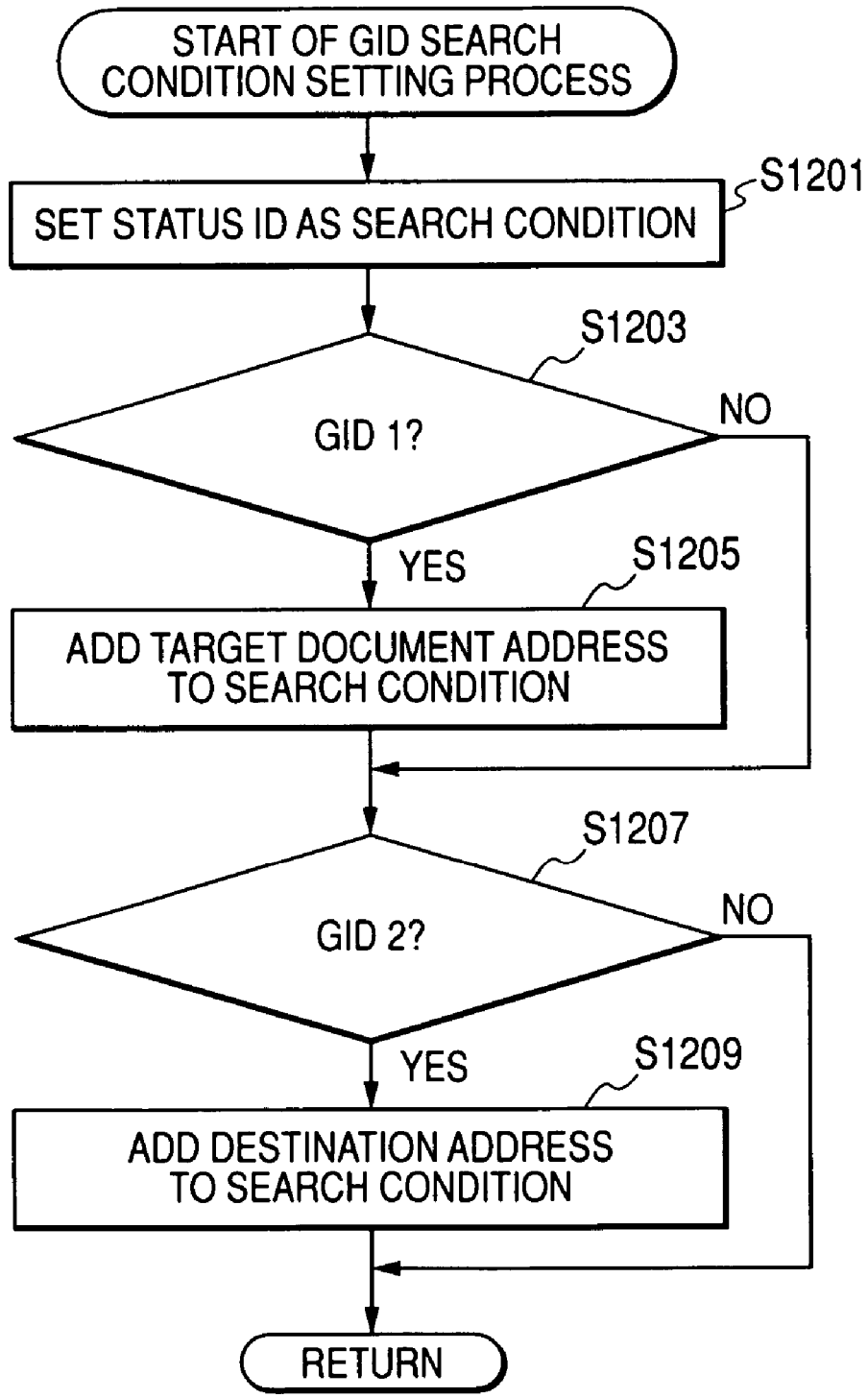
FIG. 12 is a diagram illustrating a flow of a GID search condition setting process according to the first illustrative aspect of the invention.

FIG. 12 is a diagram illustrating a flow of a GID search condition setting process. First, the status ID (see FIGS. 2A and 2B) is set as the search condition (step 1201). Next, in order to specify a search condition for performing the search in a so-called "AND condition" with the status ID set in step 1201 when the document search process of step 1105 is performed, the format of a GID is determined to extract a search condition specific to the respective processing operations. That is, it is first determined whether the GID of the status ID set in step 1201 is "1" (see FIG. 3) (step 1203).

When it is determined in step 1203 that the GID is "1" (step 1203: YES), the target document address is added as the search condition (step 1205) and the process of step 1207 is performed. When it is determined in step 1203 that the GID is not "1", the process of step 1205 is not performed, but the process of step 1207 is performed.

In step 1207, it is determined whether the GID of the status ID set in step 1201 is "2" (see FIG. 3) (step 1207).

When it is determined in step 1207 that the GID is "2" (step 1207: YES), the destination address is added as the search condition (step 1209). The GID search condition setting process is finished and then the document search process (step 1105) is performed using the search conditions specified through the GID search condition setting process.

On the other hand, when it is determined in step 1207 that the GID is not "2", the GID search condition setting process is finished. Then, the document search process (step 1105) is performed using the search conditions specified through the GID search condition setting process.

When "NO" is determined together in steps 1203 and 1207, it is the case in which the GID corresponding to the status ID is "0."

Figure 13:
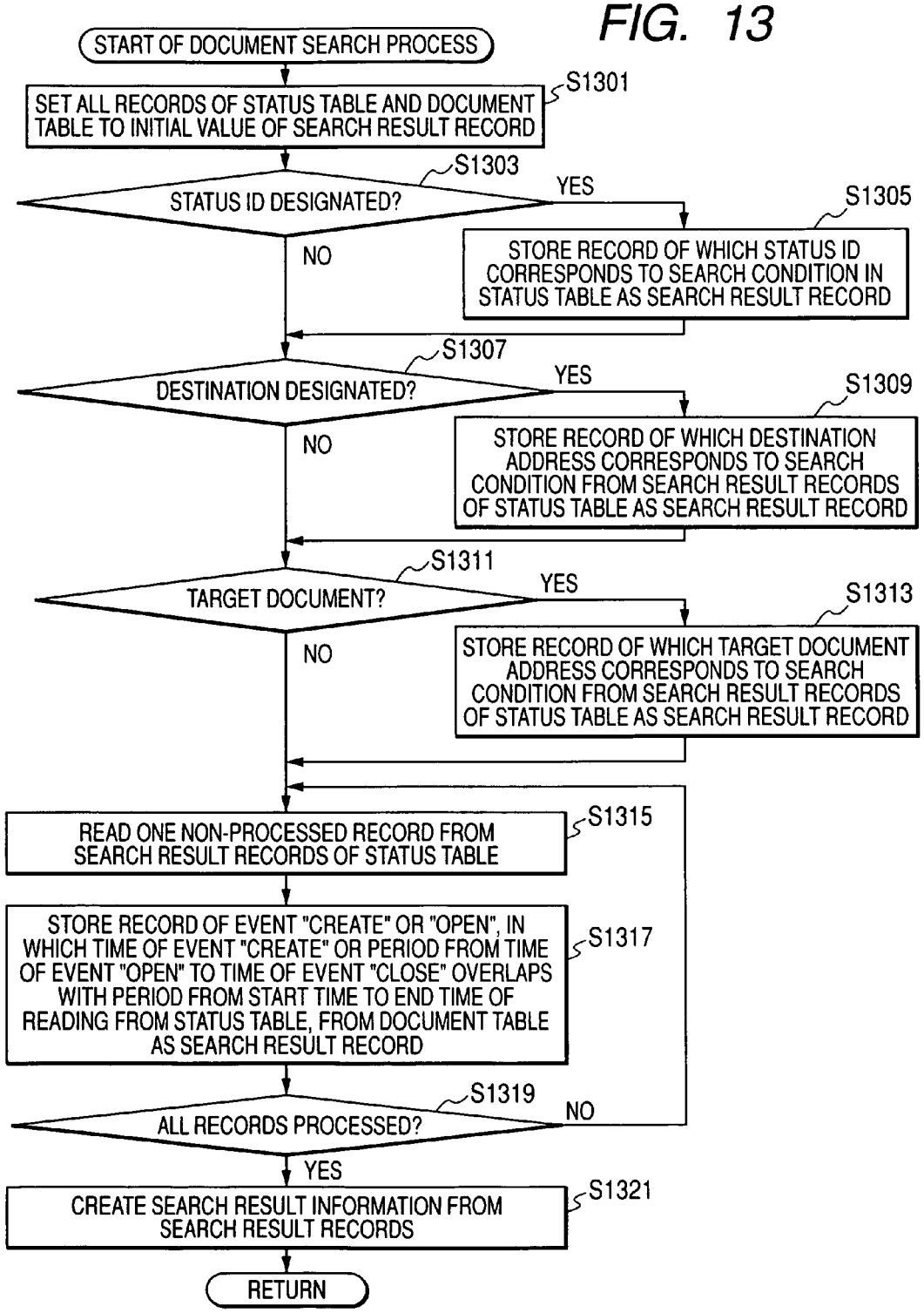
FIG. 13 is a diagram illustrating a flow of a document search process according to the first illustrative aspect of the invention.

FIG. 13 is a diagram illustrating a flow of the document search process (step 1105). First, all the records of the status table 1081 and the document table 1083 are set to the initial value of a search result record (step 1301).

Next, in order to specify a target document associated with a specific record from the status table 1081, a search process is performed with the search conditions set in the GID search condition setting process (step 1103) previously performed.

That is, first, it is determined in step 1303 whether the status ID is designated as the search condition (step 1303). In the during-activation intellectual assistance process (step 711), the status ID is generally set as the search condition in step 1201. Accordingly, the determination of step 1303 is "YES", a record corresponding to the status ID set as the search condition from the status table 1081 is stored as a new search result record (step 1305), and then the process of step 1307 is performed.

In step 1307, it is determined whether the destination address is set as the search condition, that is, whether the determination of step 1207 is "YES" and the destination address is added as the search condition in step 1209. When it is determined that the destination address is set (step 1307: YES), a record corresponding to the destination address designated as the search condition from the search result records stored in step 1305 is stored as a new search result record (step 1309), and then the process of step 1311 is performed. When it is determined in step 1307 that the destination address is not set as the search condition (step 1307: NO), the process of step 1309 is not performed, but the process of step 1311 is performed.

It is determined in step 1311 whether the target document address is set as the search condition, that is, whether the determination of step 1203 is "YES" and the target document address is set as the search condition in step 1205. When it is determined that the target document address is set (step 1311: YES), are cord corresponding to the target document address designated as the search condition from the search result records stored in step 1305 is stored as a new search result record (step 1313), and then the process of step 1315 is performed. When it is determined in step 1311 that the target document address is not set as the search condition (step 1311: NO), the process of step 1313 is not performed, but the process of step 1315 is performed.

In steps 1309 and 1313, a new search result record corresponding to the respective search conditions is stored on the basis of the search result record specified in step 1305. This is because only one GID corresponding to the respective status ID is set (see FIG. 3).

In step 1315, in order to perform the processes subsequent to the process of step 1317, one non-processed search result record (substantially one record in the status table 1081) is read from the search result records specified in steps 1303 to 1313 and the process of step 1317 is performed.

In step 1321, in the records stored in the document table 1083 and set to the initial value of the search result record in step 1301, when a period from the time registered in the record comprising the event "create" or "open" to the time registered in the record comprising the event "close" and the same document address as the document address of the record comprising the event "create" (that is, a period when it can be determined that the same document is "opened" or "treated" by the PC 10) overlaps with the period from the start time to the end time of the record read from the status table 1081 in step 1315, the record to be processed in the document table 1083 is stored as the search result record (step 1317).

That is, in the process (step 1317), the document, which, it is determined, opened or treated at the same time as the external device suitable for the instructed search condition is extracted.

In the information management system 1 according to the first illustrative aspect, when data having been used at that time are used again using its own operation as a key, the processing operation of the multifunction machine 20 or the like connected to the PC 10 is used as information indirectly indicating its own operation and the document data having been used as the same time as the processing operation can be considered as being correlated therewith. As a result, since the document data can be considered as being used at the same time as the target document (address) as a target of the processing operation, the document data can be considered as being correlated with each other. Therefore, as described above, the records having the event "create" or "open" of which the processing times overlap with each other are stored as the search result records.

When the period from the time registered in the record comprising the event "create" or "open" to the time registered in the record comprising the event "close" and comprising the same document address as the document address of the record comprising the event "create" is determined, the identity of the user (operator in FIG. 4) is considered.

In step 1323, it is determined whether the process of step 1321 is performed to all the records stored as the search result records in the status table 1081. When it is determined that the process is performed to all the records (step 1323: YES), search result information is prepared from the search result record based on the above-mentioned process (step 1325), and then the document search process (step 1105) ends. When it is determined that the process is not performed to all the records (step 1323: NO), the processes repeat from step 1315.

In the information management system 1 according to the illustrative aspect, since the records stored in the status table 1081 are stored as records in the document table at the time of performing the processing operation (see "Document Table Updating Process" to be described later), the records in both tables satisfy the search conditions in step 1317 and are stored as the search result records.

Accordingly, since the search result records stored based on the records stored through the same process is excluded, the start time or the end time of the search result record specified from the status table 1081 is preferably equal to the time of the document table 1083. In addition, even when the condition of step 1321 is satisfied, the search result records in which the target document address and the document address are identical are preferably not stored in step 1317.

When the document search process (step 1105) is finished, the control section 100 performs a process of displaying the search result based on the document search process (step 1105) (step 1107).

In the document search process of step 1317, the determination using the overlapping of two periods has been performed. However, when the time registered in the record comprising the event "create", "open", or "close" is comprised in the period from the start time to the end time of the records in the status table 1081, both periods necessarily overlap with each other. Accordingly, except for the case in which the period from the start time to the end time of the record in the status table 1081 is all comprised in the period from the time registered in the record comprising the event "create" or "open" to the time registered in the record comprising the event "close" and comprising the same document address as the document address of the record comprising the event "create" or the like, it is preferable in view of rapid determination to employ this simple determination along with the determination of step 1317.

Similarly, when one of the start time and the end time of the record of the status table 1081 is comprised in the period from the start time of the record comprising the event "create" or "open" to the time registered in the record comprising the event "close" and comprising the same document address as the document address of the record comprising the event "create" or the like, both periods necessarily overlap with each other. Accordingly, as described above, it is preferable in view of rapid determination to employ this simple determination along with the determination of step 1317.

When the time registered in the record comprising the event "create", "open", or "close" overlaps with one of the start time or the end time of the record in the status table 1081, both periods necessarily overlap with each other. Accordingly, as described above, it is preferable in view of rapid determination to employ this simple determination along with the determination of step 1317.

Figure 14:
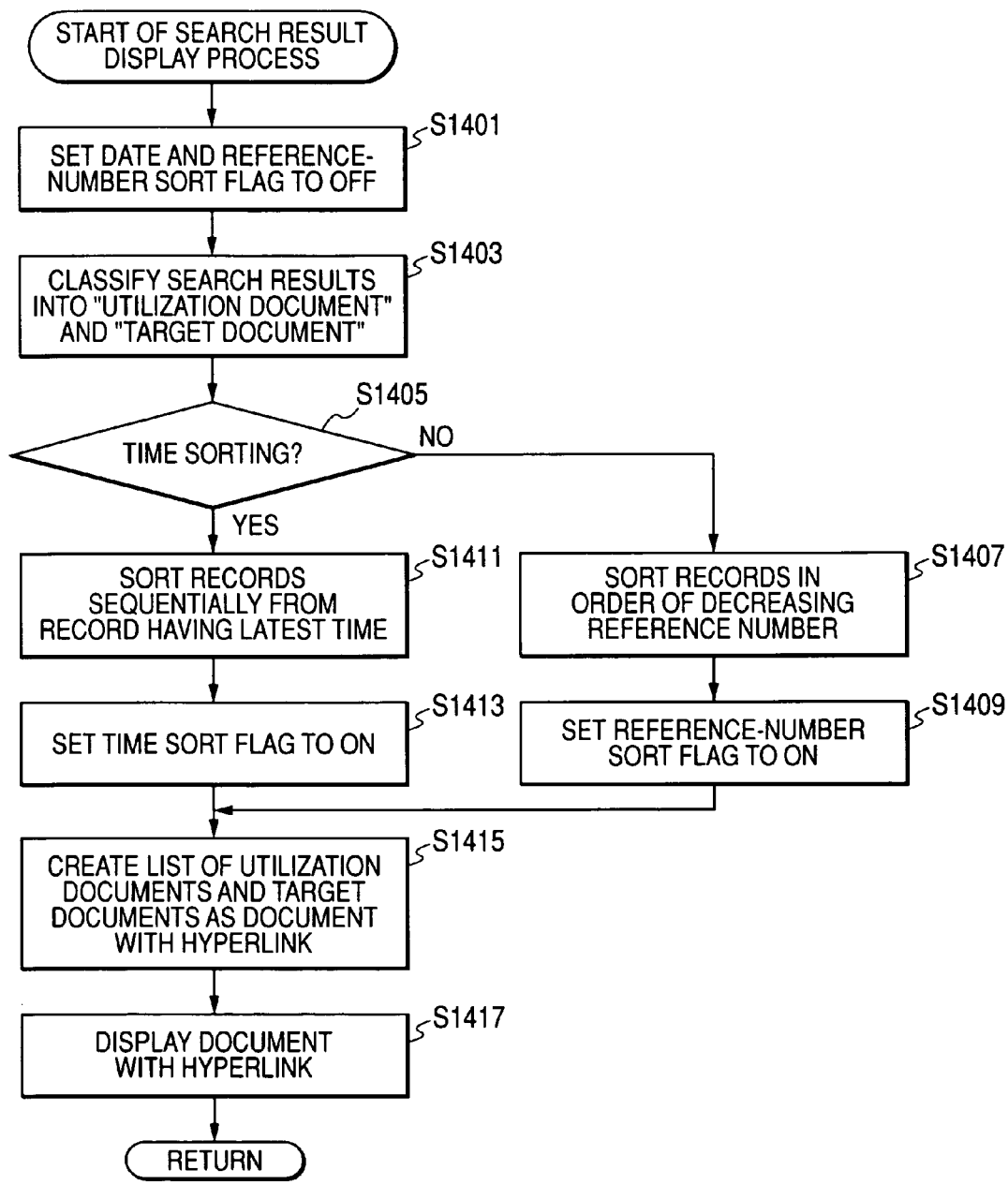
FIG. 14 is a diagram illustrating a flow of the search result display process according to an illustrative aspect of the invention.

FIG. 14 is a diagram illustrating a flow of a search result display process (step 1107). First, at the time of starting the process, the date and the reference sort flag are set to OFF (step 1401).

Next, the search result records specified as the search result information prepared in step 1321 are classified into search result records specified from the status table 1081 (specified through steps 1303 to 1313) and search result records specified from the document table 1083 (specified through steps 1315 to 1323). That is, the former is a search result associated with a target document and the latter is a search result associated with a utilization document. The search result records are classified into both search results (step 1403).

When the process of step 1403 is finished and then the search result information classified into the utilization documents and the target documents in step 1403 is displayed, a process of determining in what order the utilization documents and the target documents are displayed is performed.

First, it is determined in step 1405 whether a time sorting method is selected for the displayed order (step 1405).

Now, when the reference sorting method is selected, in other words, when the time sorting method is not selected (step 1405: NO), the search results classified into the utilization documents and the target documents in step 1403 are sequentially sorted from the search result record having the largest reference number (step 1411), and then the time sort flag is set to ON (step 1413). Thereafter, the process of step 1415 is performed.

On the other hand, when the time sorting method is selected (step 1405: YES), the controller 100 sequentially sorts the search results classified in step 1413 from the search result record having the latest time (step 1411) and then the time sort flag is set to ON (step 1413). Thereafter, the process of step 1415 is performed as described above.

In the information management system according to the illustrative aspect, at the time of displaying the search results, the search result records can be sorted using two items of time and reference number. Accordingly, it can be determined as follows by which item the search results are sorted. That is, by determining whether the search results are sorted in any one item, specifically, by determining whether the time sorting method is selected, it can be determined by which item of the time and the reference number a user intends to sort the search results (when the time sorting method is not selected, it is considered that the reference number sorting method is selected).

The time or the reference number which is used to sort the search results may be selected by allowing the user to manipulate the manipulation unit 104, for example, after performing the process of step 1401 and before performing the process of step 1405.

In step 1415, lists of the utilization documents and the target documents are prepared so as to access the documents on the basis of the search result records sorted in accordance with the condition selected in step 1407 or 1411. The lists are displayed in step 1417.

In the information management system 1 according to the first illustrative aspect, when the activation of the external device is detected in step 707, the during-activation intellectual assistance process (step 711) is performed in response to the detection. Accordingly, as for the detected document data as a target of the processing operation, the documents which are considered as being opened or treated at the same time in the past can be notified to the user with the detecting operation. As a result, when a process is necessary for the documents associated with this process, the necessary process can be performed at the same time.

For example, when a telephone call is emitted, the previous communication details can be instantaneously through out, by opening the documents opened or prepared during the previous telephone communication or the documents into which the previous communication details are converted as texts.

FIGS. 15 to 18 are diagrams illustrating the process results of the during-activation intellectual assistance process displayed on the display section 106 of the PC 10 by performing step 1417.

Figure 15:
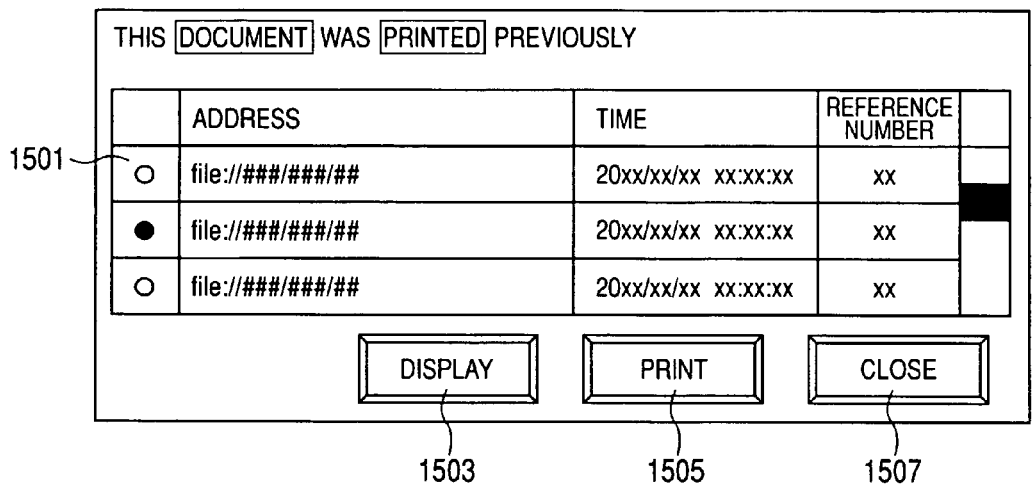
FIG. 15 is a diagram illustrating a display format (associated with the status table) of a search result in the during-activation intellectual assistance process according to an illustrative aspect of the invention.

Specifically, FIG. 15 shows a search result associated with the target document specified by performing the during-activation intellectual assistance process (step 711) when an instruction of printing documents data stored in the storage section 108 is given to the recording section 202 of the multifunctional machine 20 from the PC 10 (a PC print operation is performed as the processing operation: see FIG. 3).

That is, when the PC print operation is performed, the document search process (step 1105) is performed on the basis of the target document address as a processing target of the PC print operation. As a result, the time when the target document data as a print target of the print operation were printed is displayed in the format shown in FIG. 15. In this case, the addresses and the reference numbers in FIG. 15 are displayed to be identical.

At the time of displaying the search result of the during activation intellectual assistance process, the records can be selected through the radio button 1501 by the use of the manipulation unit 104. By pushing the display button 1503 after the selection, the data specified by the selected record can be displayed on the display unit 106. By pushing the print button 1505 after the selection by the use of the radio button 1501, the data specified by the selected record can be printed out from the writer 202. By pushing the closing button 1507, the display of the search results of the during-activation intellectual assistance process can be closed.

Figure 16:
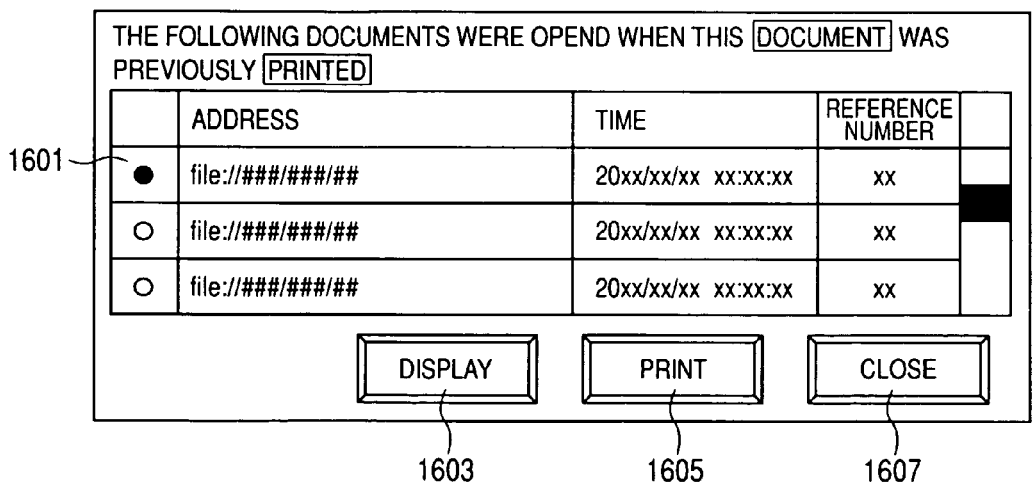
FIG. 16 is a diagram illustrating a display format (associated with the document table) of a search result in the during-activation intellectual assistance process according to an illustrative aspect of the invention.

FIG. 16 shows a utilization document opened in the period in which the target document data as the present print target was being printed.

For example, when the ID in FIG. 2 is "sid1" (the start time of the record is "11:59:00 on Jul. 15, 2005" and the end time is "12:02:00 on Jul. 15, 2005") and the document addresses of the utilization documents associated with the target document of sid1 are "file://*/*/d2" and "file://*/*/d3" (in FIG. 4, the time registered in the ID utilizing the document address of the utilization document is "11:50:00 on Jul. 15, 2005" for did2, "12:00:00 on Jul. 15, 2005" for did6, and "12:01:00 on Jul. 15, 2005" for did8), the documents associated with "file://*/*/d2" and "file://*/*/d3" are opened in the period when the PC print operation associated with sid1 was being performed. Accordingly, predetermined details associated with the two utilization documents are displayed in the format shown in FIG. 16.

Since the radio button 1601, the display button 1603, the print button 1605, and the closing button 1607 have the same functions-as the radio button 1501, the display button 1503, the print button 1505, and the closing button 1507, descriptions thereof will be omitted.

FIGS. 17 and 18 show display examples when the communication results from the telephone transmission (event "TLT" in FIG. 3) or the telephone reception (event "TLR" in FIG. 3 through the line communication section 2112 of the multifunction machine 20 in step 707) (the course to the display is the same as described above and thus is omitted).

Since the buttons shown in FIGS. 17 and 18 have the same functions as the buttons shown in FIG. 15, descriptions thereof will be omitted.

In FIG. 15, since the processing operation is a PC print operation, the GID is "1" (see FIG. 3), and the document search process (step 1105) is performed using the document address as the search condition, the addresses and the reference numbers are identical and only the times are different from each other. However, in case of the telephone transmission or the telephone reception, the GID is "2" (see FIG. 3) and the document search process (step 1105) is performed without using the document address as the search condition. Accordingly, the target document addresses shown in "Address" of FIG. 17 are different from each other.

In the information management system 1 according to the first illustrative aspect, the addresses in FIGS. 15 to 18 are displayed in the hyperlink format (step 1417), and when the hyperlinks are selected using the operation section 104, the document data associated with the address are read from the storage section 108 and are displayed on the display section 106.

Subsequently to the search result display process, it is determines whether the status ID input (detected) from the external device in step 709 is the emission of a telephone call (the event "TLT" in FIG. 3) or the reception of a telephone call (the event "TLR" in FIG. 3) (step 1109).

Here, when it is determined that the status ID is not TLT and TLR (step 1109: NO), the during-activation intellectual assistance process ends.

On the other hand, when it is determined that the status ID is one of TLT and TLR (step S1109: YES), the search result output process is performed in step 1111.

FIG. 19 is a diagram illustrating a flow of the search result output process.

When the status ID is one of TLT and TLR, the search results are displayed as shown in FIGS. 17 and 18 and it is first determined whether the closing button (for example, the closing button 1707 in FIG. 17) on the search result display screen is pushed (step 1901). When it is determined that the closing button is pushed (step S1901: YES), the search result display screen is closed and the during-activation intellectual assistance process ends.

When it is determined that the closing button is not pushed (step 1901: NO), it is determined in step 1903 whether the display button or the print button on the search result display screen is pushed.

When it is determined that the display button or the print button is not pushed (step 1903: NO), the procedure is returned to step 1901 and the processes of steps 1901 and 1903 are repeated until any one button is pushed.

On the other hand, when it is YES in step 1903, that is, when one of the display button and the print button is pushed, the record selected by the radio button at the time of pushing the button is selected as an output target record (step 1905) and a print request for the document data specified by the output target record is transmitted to the multifunction machine 20 (step 1907).

The output request in step 1907 is a printout request to the writer 202 when the print button is pushed and a display request to the display unit 218 of the multifunction machine 20 when the display button is pushed. When the display button is pushed, the display unit 106 of the PC 10 displays the data as described above.

The controller 100 transmits the document data specified by the output target record to the destination address read out in step 1101 by PC facsimile.

Since the document correlated with the interactive communication can be shared with the communication partner party by the search result output process, the previous communication details can be thought out clearly by opening the previous communication details converted into a text or the document correlated with the interactive communication during the interactive communication. Accordingly, it can be made easy to explain the details associated with the previous communication details to be delivered from now on.

In the first illustrative aspect, data are transmitted to the facsimile of the communication partner party after transmitting the print request to the multifunction machine 20 (steps 1907 and 1909), but the order of performing the steps is not limited thereto and the steps may be performed at the same time.

At the time of the emission of a telephone call, the interactive communication is often performed after the documents associated with the communication contents are searched out in advance and the communication details are arranged. Accordingly, when a party equipped with the information management system emits a telephone call, the correlated data may be transmitted to the communication partner party without performing the process of step 1907.

In the first illustrative aspect, the correlated document data are transmitted to the facsimile of the communication partner party by PC facsimile, but the transmission is not limited to the PC facsimile. The correlated document data may be transmitted by electronic mail or the multifunction machine 20 may be set to print out the document data and to transmit the document data to the communication partner party by facsimile. That is, it is satisfactory if only data can be provided to the communication partner party.

In the first illustrative aspect, the document data are selectively output, but the document data are not necessarily selectively output. The output method may be properly selected depending upon the environment of the information management system, for example, by printing out all the document data displayed in the search result display process or by outputting only a part of the document data.

As described above, when the telephone function of the multifunction machine 20 operates by the during-activation intellectual assistance process, the previous communication details converted into a text or data correlated with the communication details are search for by performing the document search process using the destination telephone number detected from the multifunction machine 20 as a key. Then, by selecting data to be opened from the search results, the data can be printed out or displayed and can be transmitted to the communication partner party.

As a result, in comparison with oral explanation of the previous communication details or the correlated information, the details can be more easily delivered to the opposite party, thereby smoothly talking with the opposite party.

By storing the document data in an external server other than the PC 10, other users can enjoy the advantages of the first illustrative aspect.

(Status Table Registering Process)

Figure 20:
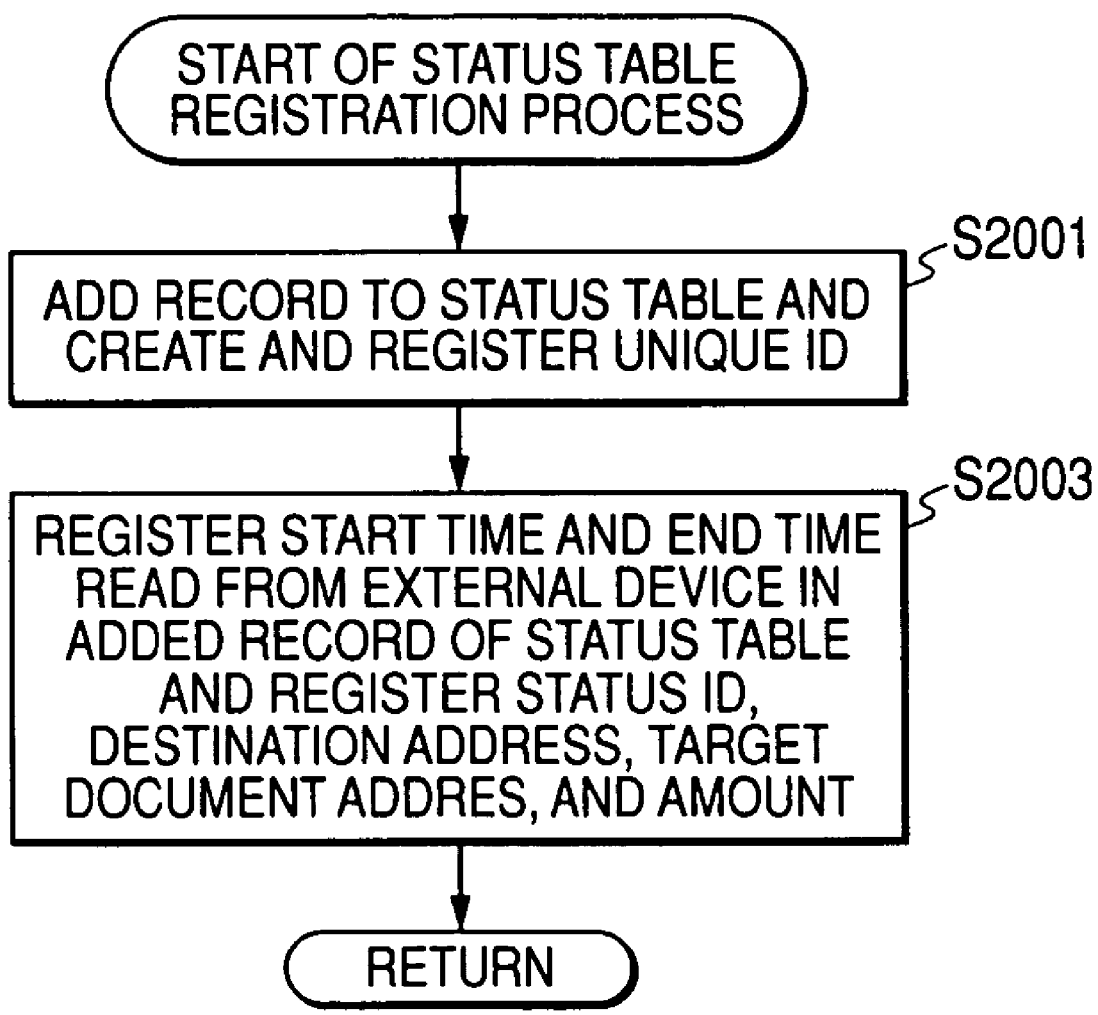
FIG. 20 is a diagram illustrating a flow of a status table registration process according to an illustrative aspect of the invention.

FIG. 20 is a diagram illustrating a flow of a registering process in the status table 1081 shown in FIG. 2.

When the status table registering process is performed in step 715, the control section 100 of the PC 10 additionally creates a unique ID of a record to be registered in the status table 1081. Then, the control section registers the unique ID as an ID of the new record (step 2001) and then performs the process of step 2003.

Instep 2003, the time when the activation of the external device is detected in step 707 and the time when the activation end of the external device of which the activation has been detected in step 707 is detected in step 713 are registered as the start time and the end time of the new record in step 2001, respectively, and the status ID, the destination address, the target document address, and the amount, which are input from the external device of which the activation has been detected and stored in the RAM or the like of the control section 100 in step 709 before the during-activation intellectual assistance process (step 711), are similarly registered in the new record in step 2001.

(Manual Intellectual Assistance Process)

Figure 21:
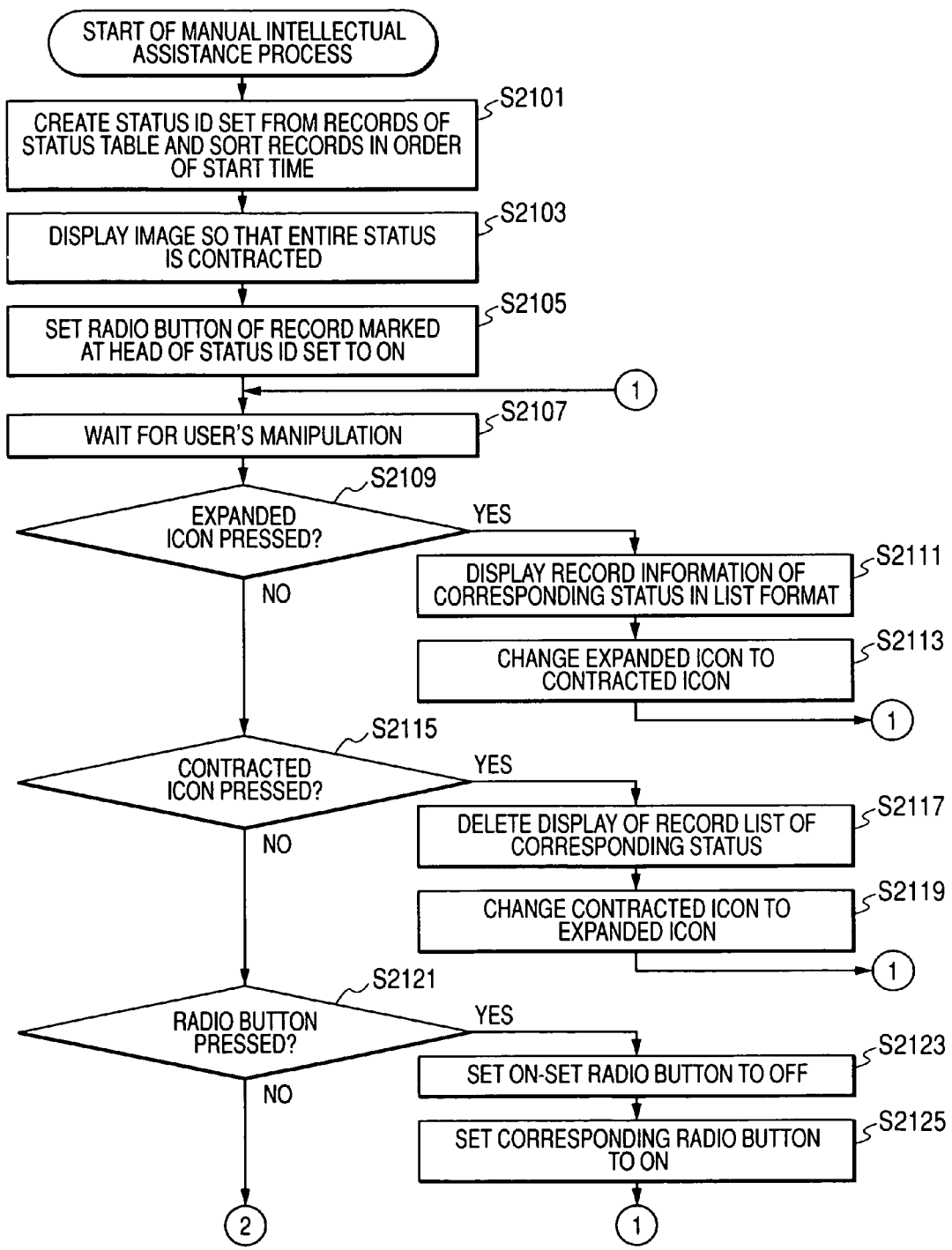
FIG. 21 is a diagram illustrating a flow of a manual intellectual assistance process according to an illustrative aspect of the invention.
Figure 22:
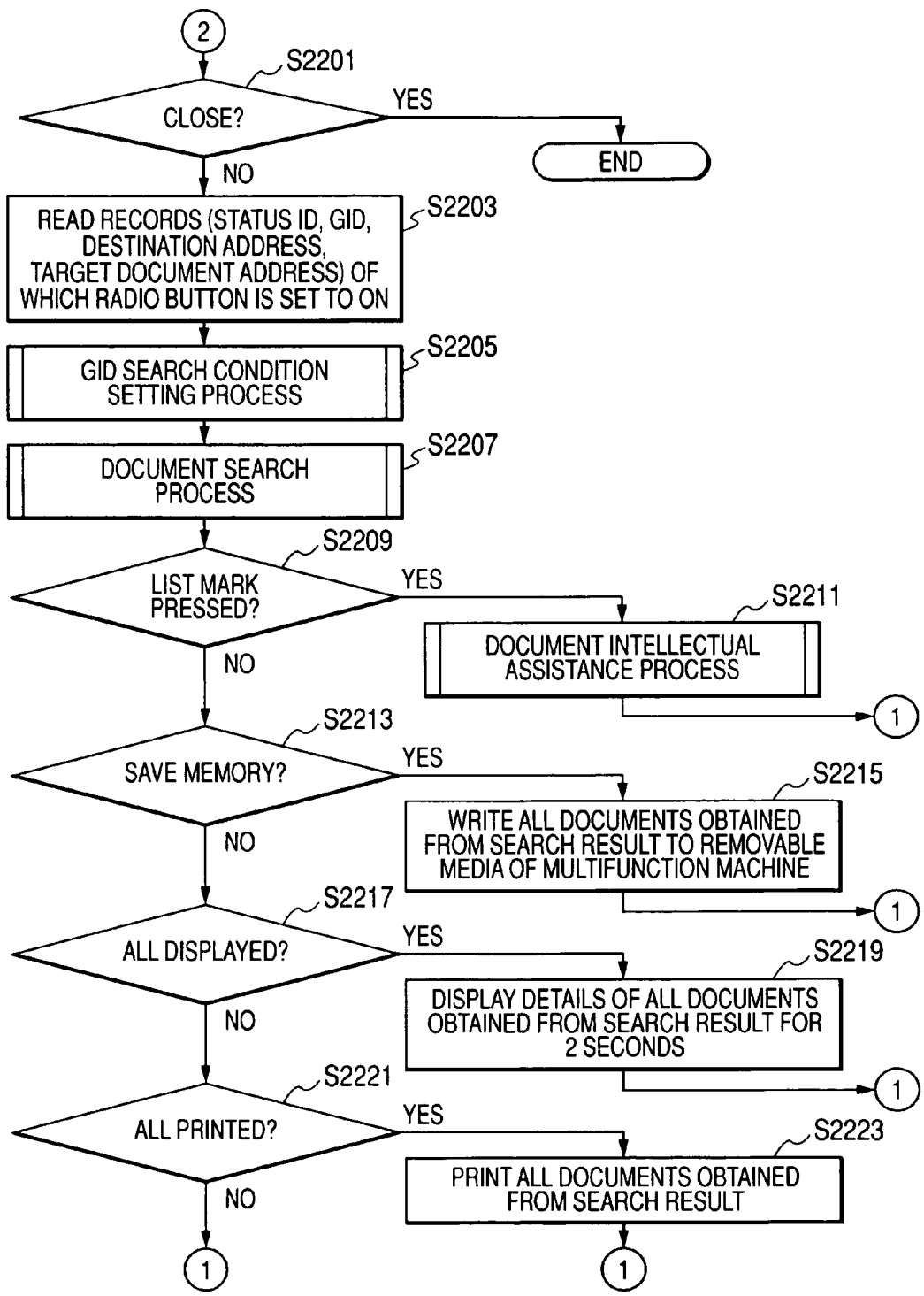
FIG. 22 is a diagram illustrating a flow of the manual intellectual assistance process according to an illustrative aspect of the invention.
Figure 24:
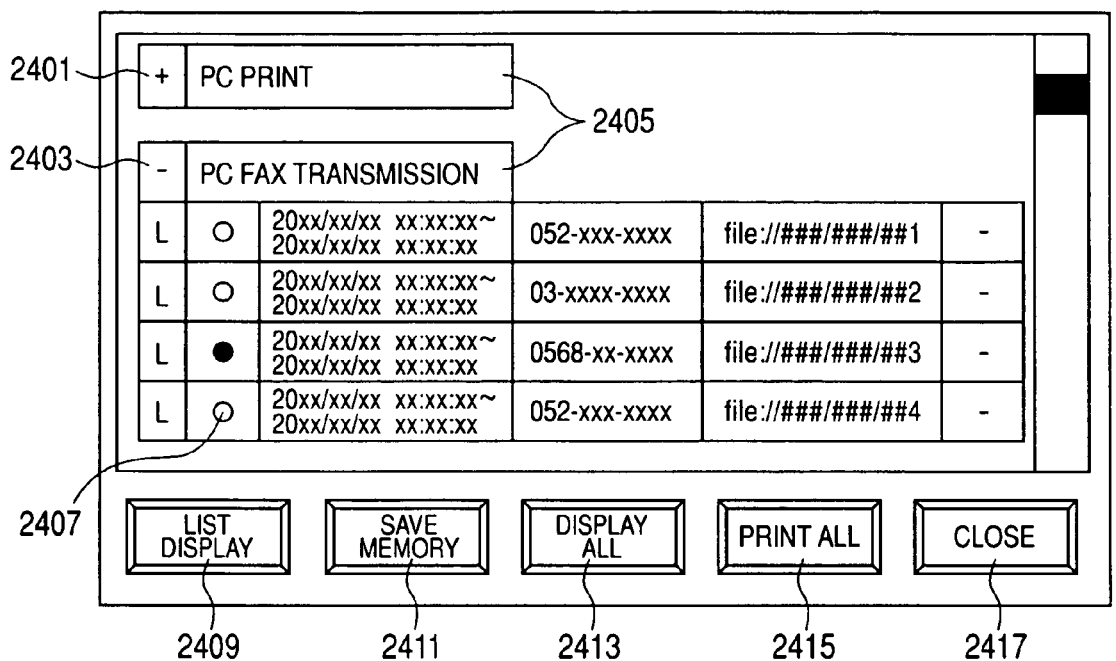
FIG. 24 is a diagram illustrating a display format (associated with the status table) of a search result in the manual intellectual assistance process according to an illustrative aspect of the invention.

FIGS. 21 and 22 are diagrams illustrating a flow of the manual intellectual assistance process. FIG. 24 is a diagram illustrating a display format of information displayed on the display section 106 of the PC with the performing of the manual intellectual assistance process.

In step 719, with the start of the manual intellectual assistance process, this process starts. This process operates in parallel to the PC main process shown in FIG. 7. That is, the process of step 719 proceeds to the process of step 701 without waiting for the end of the manual intellectual assistance process after the manual intellectual assistance process starts.

The control section 100 of the PC 10 creates a set of status IDs from the records of the status table 1081, performs a process of sorting the records of the set of status IDs in the order of start times (step 2101), and displays the result of the process on the display section 106 of the PC 10 (step 2103).

Here, in step 2103, the entire statuses 2405 are displayed in a contracted format, and specifically, only the titles of the processing operations indicated by the status IDs are displayed (see the display format of the PC print operation in FIG. 24).

In step 2105, in the display format displayed through the process of step 2103, a radio button 2407 (see FIG. 24) of the head record (the record sorted in the head in step 2101) of the status 2405 displayed at the uppermost position (PC print in FIG. 24) is set to ON with the initial setting (step 2105).

In the state in which the processes up to step 2105 are performed after the manual intellectual assistance process starts (step 719), the control section 100 waits until a user manipulates by the use of the operation section 104 (step 2107).

In the wait state (step 2107), when the user input an instruction by the use of the operation section 104, the control section 100 determines whether the instruction is to press an expanded icon 2401 (see FIG. 24) (step 2109).

Here, when the input instruction is to press the expanded icon 2401 (step 2109: YES), the record information of the status 2405 corresponding to the pressed expanded icon 2401 is displayed in a list format in response to the sorting process of step 2101 (step 2111) and the expanded icon 2401 of the expanded status 2405 is changed to a contracted icon 2403. (step 2113).

The processes of steps 2111 and 2113 are specifically described with reference to FIG. 24. In case of the PC fax transmission operation, the status 2405 is displayed along with the expanded icon 2401, similarly to the PC print operation, before the expanded icon 2401 is pressed (step 2109) (in other words, the list (records) is not displayed).

In this state, when the process of step 2109 is performed to the expanded icon 2401 for the PC fax transmission (step 2109: YES), the records of which the status IDs are marked "FPT" in the status table 1081 are displayed in the format shown in FIG. 24 in the sorting order of step 2101 (step 2111), and the expanded icon 2401 associated with the PC fax transmission is changed to the contracted icon 2403 (step 2113: the display is changed from "+" to "−"). At the time of first ending the process of step 2113, the process of step 2105 is valid, and all the radio buttons 2407 are set to OFF in the records displayed associated with the PC fax transmission.

On the other hand, in the wait state of step 2107, when the input instruction is not to press the expanded icon 2401 (step 2109: NO), but to press the contracted icon 2403 (step 2115: YES), the display in the PC fax transmission format shown in FIG. 24 is changed to the PC print format. That is, the display of the record list of the corresponding status 2405 is erased (step 2117) and the contracted icon 2403 is changed to the expanded icon 2401 (step 2119).

In the wait state of step 2107, when the input instruction is not to press the contracted icon 2403 (step 2115: NO), but to press the radio button 2407 (step 2121: YES), the radio button 2407 set to ON for a predetermined record (the head record of the uppermost status 2405 in the initial state) is changed to OFF (step 2123) and the radio button 2407 corresponding to the user's manipulation is set to ON (step 2125).

After the processes of step 2113, 2119, and 2125 are performed, the control section waits in step 2107 until the user's manipulation is performed.

Here, in the wait state of step 2107, when the instruction input by the user's manipulation is not to press any one of the expanded icon 2401, the contracted icon 2403, and the radio button 2407 (steps 2109, 2115, and 2121: NO), the process shown in FIG. 21 is performed.

That is, the control section 100 of the PC 10 determines whether the instruction input by the user's manipulation is the end of the manual intellectual assistance process, specifically, whether a closing button 2417 is pressed (step 2201). When it is YES (step 2201: YES), the process ends.

On the contrary, when the instruction is not to press the closing button 2417 (step 2201: NO), the instruction is to press a list display button 2409, a memory storage button 2411, an all display button 2413, or an all print button 2415. Accordingly, in order to perform the processes corresponding to the buttons, the records of which the radio button is set to ON (status ID, GID, destination address, target document) are read (step 2203).

The GID search condition setting process (step 2205) and the document search process (step 2207) are performed on the basis of the read information, and then the process of step 2209 is performed. Both processes performed in steps 2205 and 2207 are similar to the GID search condition setting process (step 1103) and the document search process (step 1105) performed in the during-activation intellectual assistance process (step 711), and thus description thereof is omitted.

In step 2209, it is determined whether the instruction, which is input through the user's manipulation of the operation section 104 and which results in the performing of the process of step 2203 is to press the list display button 2409.

When the instruction is to press the list display button 2409 (step 2209: YES), the document intellectual assistance process is activated by the use of the result of the document search process of step 2207 (step 2211). The details of the document intellectual assistance process are described later with reference to FIG. 23.

On the contrary, when the instruction is not to press the list display button 2409 (step 2209: NO), it is determined whether the instruction is to press the memory storage button 2411 (step 2213). When it is YES (step 2213: YES), the control section 100 instructs the multifunction machine 20 to write the document data of the document address described in the search result record obtained through the document search process (step 2207) to a removable media 2101, and transmits the corresponding document data from the storage section 108 to the multifunction machine 20 through the communication section 102. On the other hand, the control section 200 of the multifunction machine 20 writes the corresponding document data received through the communication section 214 in response to the instruction to the removable media 2101 (step 2215).

When the instruction is not to press the memory storage button 2411 (step 2213: NO), it is determined whether the instruction is to press the all display button 2413 (step 2217) When it is YES (step 2217: YES), the control section 100 opens the document data of the document address described in the search result record obtained through the document search process (step 2207), and sequentially displays the contents on the display section 106 with a predetermined interval of time, for example, 2 seconds (step 2219).

When the instruction is not to press the all display button 2413 (step 2217: NO), it is determined whether the instruction is to press the all print button 2415 (step 2217). When it is YES (step 2217: YES), the control section 100 transits the document data of the document address described in the search result record obtained through the document search process (step 2207) to the multifunction machine 20 through the communication section 102, and allows the recording section 202 of the multifunction machine 20 to print the document data (step 2223).

When the instruction is not to press the all print button 2415 (step 2221: NO), a process corresponding to the press is performed or it is determined that the press is erroneous. Then, the control section waits until the user's manipulation is performed (step 2107).

When the processes of steps 2211, 2215, 2219, and 2223 are finished, the control section waits in step 2107 until the user's input is performed.

Figure 23:
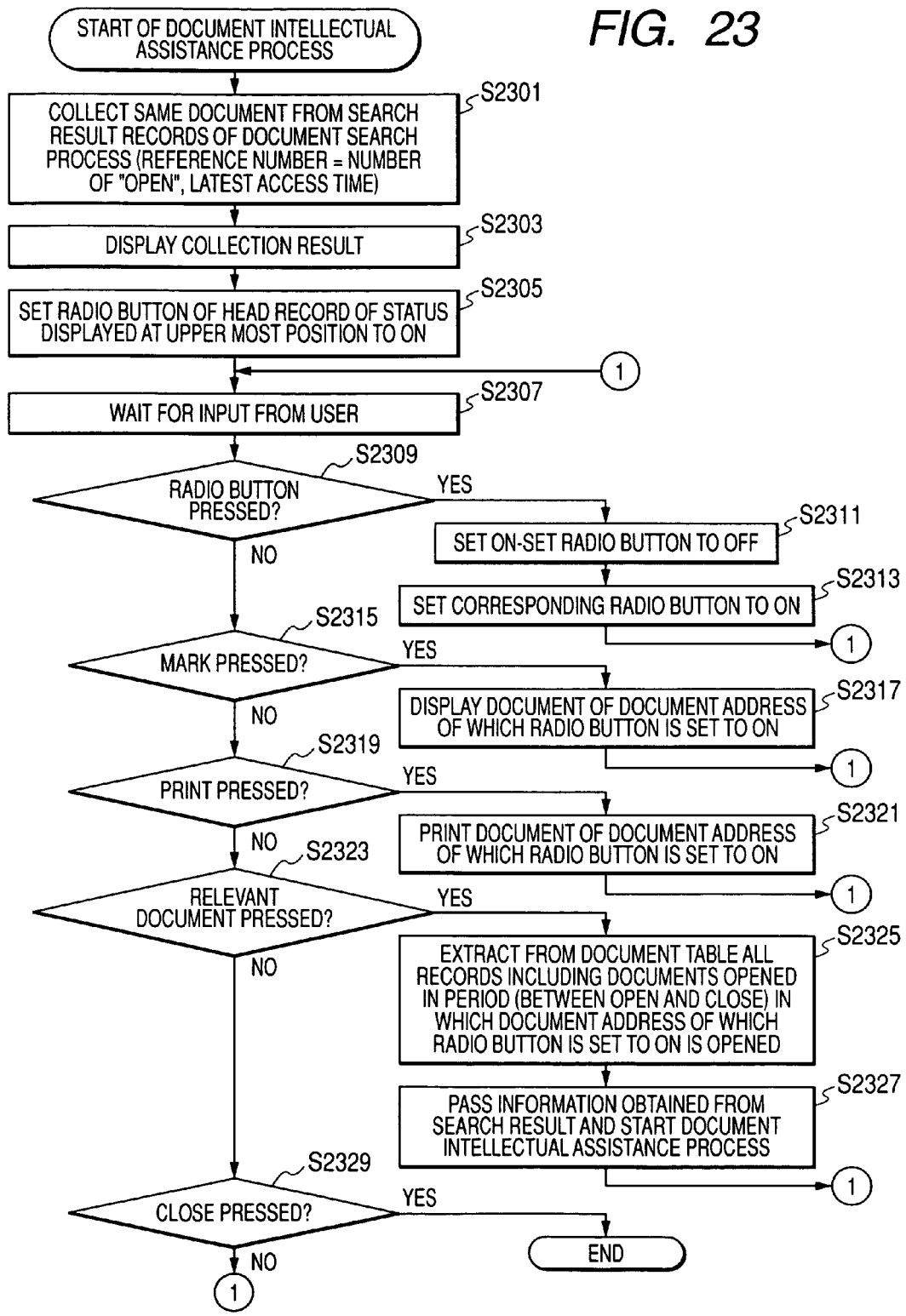
FIG. 23 is a diagram illustrating a flow of a document intellectual assistance process according to an illustrative aspect of the invention.
Figure 25:
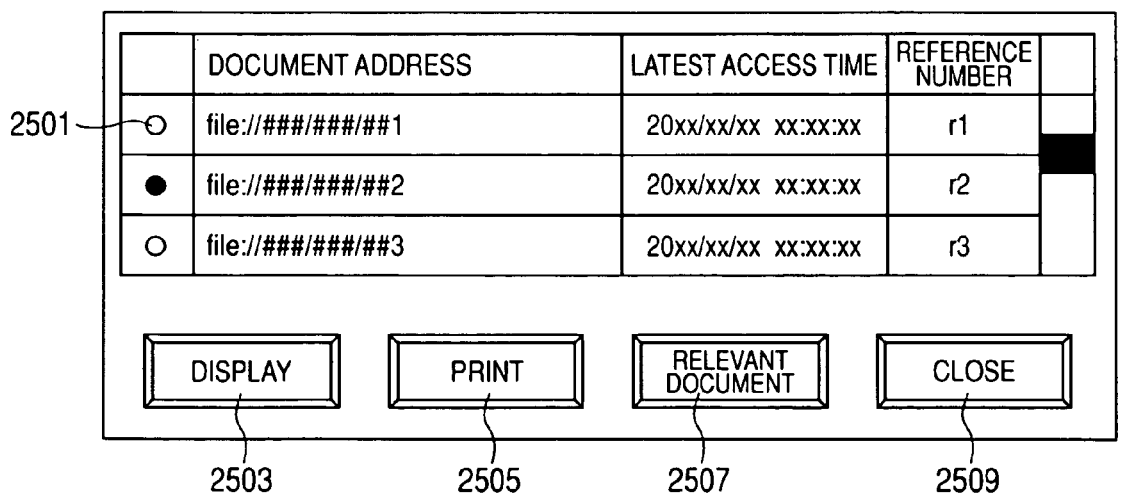
FIG. 25 is a diagram illustrating a display format (associated with the document table) of a search result in the manual intellectual assistance process according to an illustrative aspect of the invention.

FIG. 23 is a diagram illustrating a flow of the document intellectual assistance process started in step 2211. FIG. 25 is a diagram illustrating a display format of information displayed on the display section 106 of the PC 10 at the time of performing the document intellectual assistance process.

First, in step 2301, the control section 100 of the PC 10 collects the number of reference to the document data (the number of records of which the event is "open") of the same document address and the final access time (time described in the latest record) from the search result records obtained through the document search process (step 2207) by the use of the records comprising the same document address (step 2301), and then performs the process of step 2303.

In step 2303, the collection result is displayed in the format shown in FIG. 25 on the display section 106. At this time, the radio button of the head record among the displayed records is set to ON (step 2305).

Here, in the state in which the processes up to step 2305 are performed after the document intellectual assistance process starts (step 2211), the control section 100 waits until the user manipulates the operation section 104 (step 2307).

In the wait state (step 2307), when the user input an instruction through the operation section 104, the control section 100 determines whether the input instruction is to press the radio button 2501 (see FIG. 25) (step 2309). When it is YES (step 2309: YES), the process of step 2301 is performed.

In step 2307, the radio button 2501 set to ON in a predetermined record (the head record in the initial state) is set to OFF (step 2311) and the radio button 2501 corresponding to the user's manipulation is set to ON (step 2313).

On the other hand, when it is determined in step 2309 that the input instruction is not to press the radio button 2501, it is determined whether the input instruction is to press the display button 2503 (step 2315). When it is YES (step 2315: YES), the process of step 2317 is performed.

In step 2317, the document data of the document address in which the radio button is set to ON is opened and displayed on the display section 106.

When it is determined in step 2315 that the input instruction is not to press the display button 2503, it is determined whether the input instruction is to press the print button 2505 (step 2319). When it is YES (step 2319: YES), the process of step 2321 is performed.

In step 2321, the control section 100 reads the document data of the document address, in which the radio button is set to ON, from the storage section 108 and transmits the document data to the multifunction machine 20 through the communication section 102, and the recording section 202 of the multifunction machine 20 prints the document data.

When it is determined in step 2319 that the input instruction is not to press the print button 2505, it is determined whether the input instruction is to press a relevant document button 2507 (step 2323). When it is YES (step 2323: YES), the process of step 2325 is performed.

In step 2325, all the records of which the event is "open" in the period (between open and close) when the document data of the document address in which the radio button 2501 is set to ON are opened are extracted from the document table 1081 (step 2325).

Specifically describing the process with reference to FIG. 25, since the document data stored at the document address "file:/###/###/###2" comprises the number of reference of r2, the document data are opened r2 times. Accordingly, the extraction is performed to all the r2 periods.

When the period when the document data of the document address in which the radio button 2501 is set to ON is determined, the identity of the user (operator in FIG. 4) is considered.

The document intellectual assistance process starts again with respect to the search result records obtained through the extraction process of step 2325 (step 2327).

That is, the user can sequentially see documents associated with a document by performing the document intellectual assistance process.

When it is determined in step 2323 that the input instruction is not to press the relevant document button 2507, the control section 100 determines whether the input instruction is to press the closing button 2509 (step 2329). When it is YES (step 2329: YES), the control section ends the document intellectual assistance process (step 2211) and waits in step 2107 until the user's manipulation is performed.

On the other hand, when it is determined that the input instruction is not to press the closing button 2509 (step 2329: NO), the control section performs a process corresponding to the press or determines that the press is erroneous, and waits until the user's manipulation is performed (step 2307).

After performing the processes of steps 2313, 2317, 2321, and 2327, the control section waits again in step 2307 until the user's input is performed.

(Process 2 of Information Management System)

Next, a process (2) of the information management system 1083 comprising the above-mentioned configuration is described with reference to the drawings. The process (2) starts in parallel to the process (1).

Figure 26:
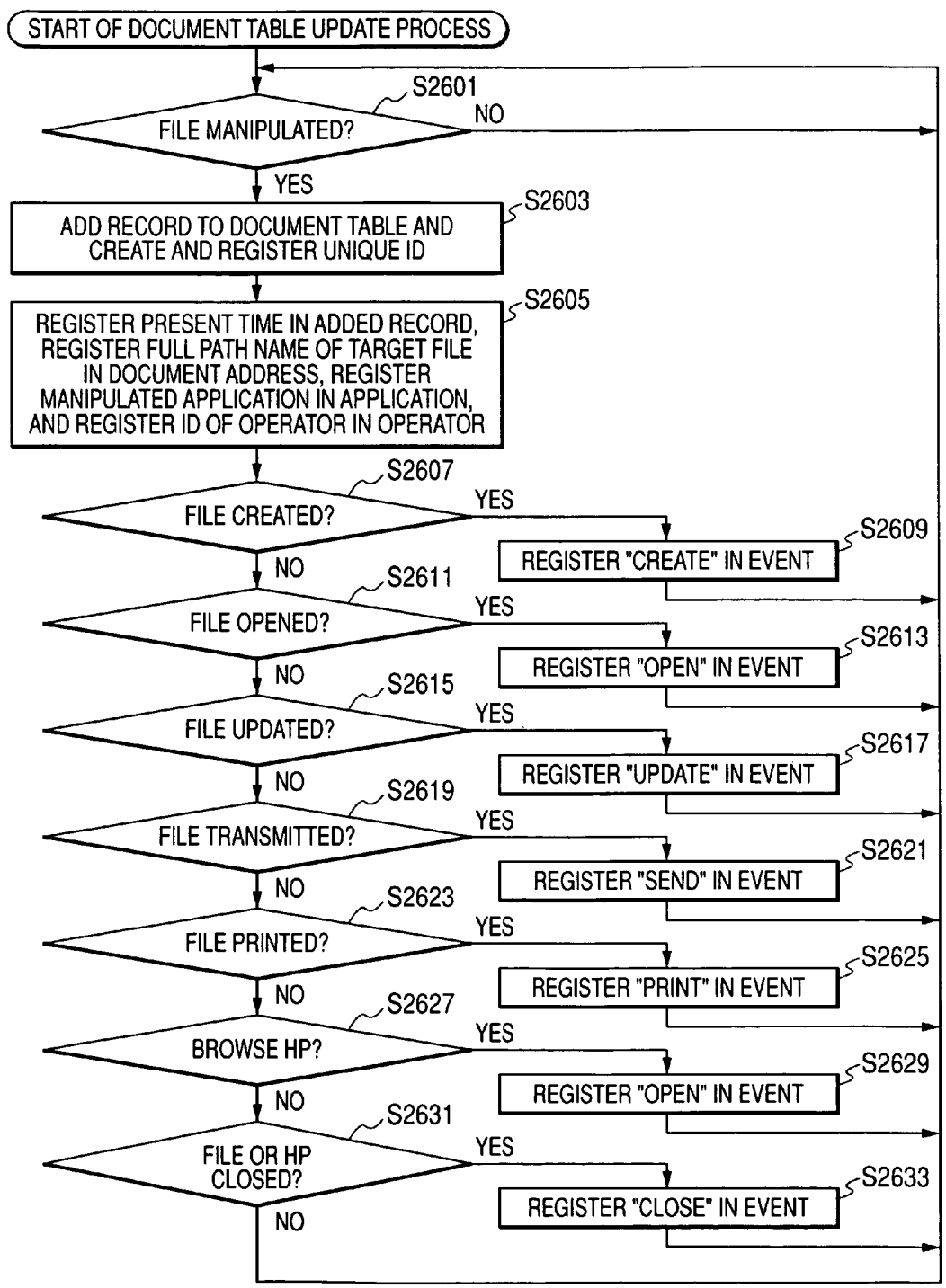
FIG. 26 is a diagram illustrating a flow of a document table updating process according to an illustrative aspect of the invention.
Figure 27:
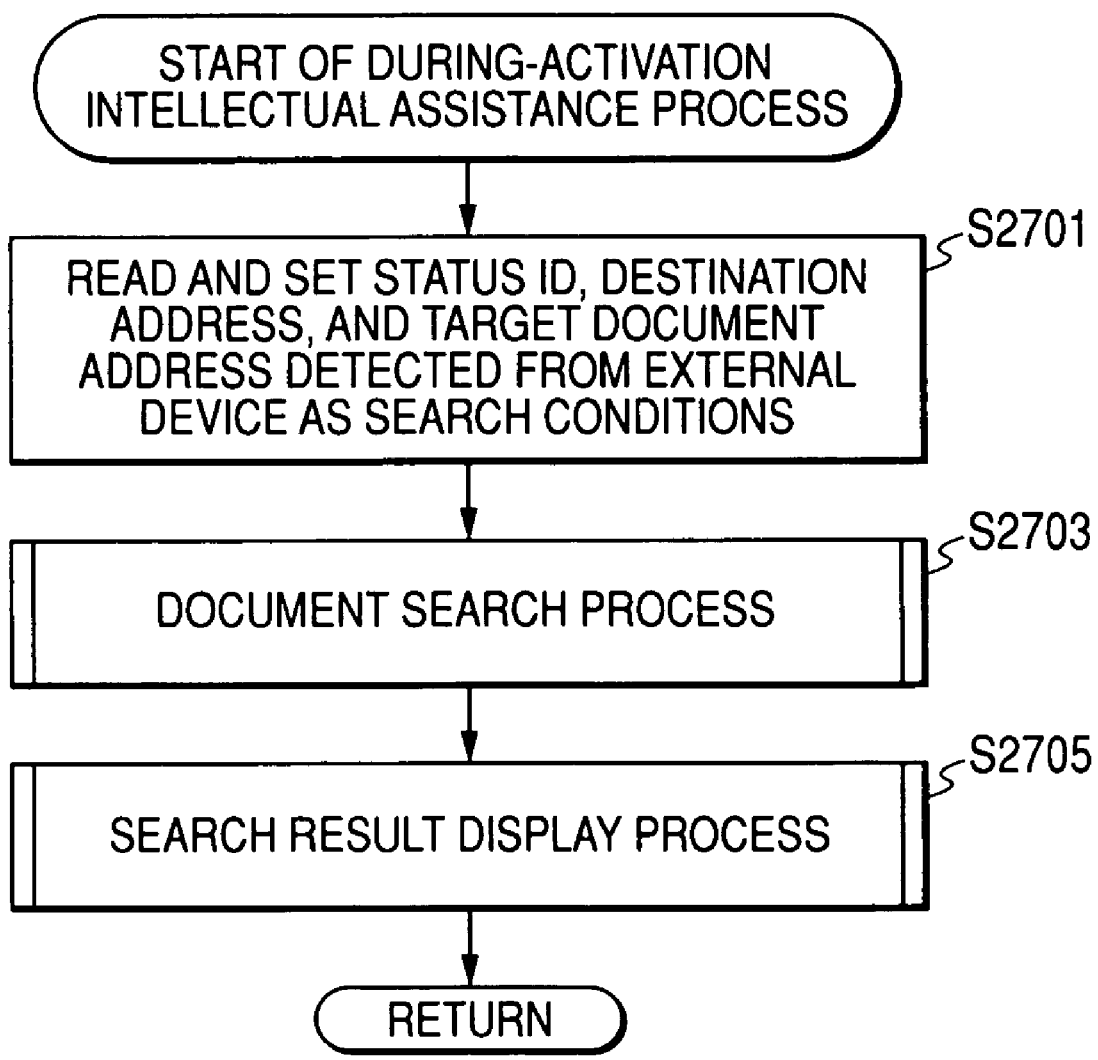
FIG. 27 is a diagram illustrating a flow of the during-activation intellectual assistance process according to a second illustrative aspect of the invention.

FIG. 26 is a diagram illustrating a flow of a process of updating the document table 1083 performed by the PC 10. The process (2) shown in the flow is performed by the control section 100 of the PC 10, and more specifically, is performed by the CPU of the control section 10 by the use of the program stored in the ROM or the like.

First, when the document data stored in the storage section 108 are manipulated by the use of the operation section 104 or the operation of the multifunction 20 is carried out, that is, when the target document data are transmitted to the PC 10 from the multifunction machine 20 by starting the processing operation (status) described as "(copied to PC)" among the items of the "target document address" of FIG. 3, the target document data are newly stored in the storage section 108, the RFID tags 322 and 324 of the books 32 and 34 are read by the RFID tag reading section 306 of the book sensor 30, and the information is transmitted to the PC 10 through the communication section 34, the control section 100 determines whether a homepage (hereinafter, referred to as "HP") on internet 70, which introduces the book 32 or the like associated with the transmission from the book sensor 30, is opened (hereinafter, the manipulations or processes are referred to as "file manipulation") (step 2601).

When it is determined in step 2601 that the file manipulation is performed (step 2601: YES), the control section 100 adds a record to the document table 1083, creates an ID unique to the record, registers the unique ID (step 2603), and then performs the process of step 2605.

When it is determined in step 2601 that the condition is not satisfied (step 2601: NO), the control section waits until the file manipulation is performed.

In step 2605, the present time is registered to the record added in step 2603, registers an application obtained by preparing a full pass name of the target file with a application to the document address, and registers the type of the operator to the operator.

Thereafter, a process of determining information to be registered to the "event" not yet registered is performed (steps 2607 to 2633).

First, the control section 100 determines whether the file manipulation performed in step 2601 is to store a new document file in the storage section 108 (hereinafter, referred to as "file creation" (step 2607). The control section registers "create" as an event, when the file manipulation is the file creation (step 2607: YES).

On the other hand, when the file manipulation is not the file creation (step 2607: NO), the control section determines whether the file manipulation is to open the document file stored in the storage section 108 (hereinafter, referred to as "file opening") (step 2611). When it is YES (step 2611: YES), the control section registers "open" as an event (step 2613).

When it is not YES in step 2611 (step 2611: NO), it is determined whether the document data stored in the storage section 108 is updated (overwritten) (step 2615). When it is YES (step 2615: YES), "update" is registered as an event (step 2613).

When it is not YES in step 2615 (step 2615: NO), it is determined whether the document data stored in the storage section 108 is transmitted (the PC fax transmission is comprised) (step 2619). When it is YES (step 2619: YES), "send" is registered as an event (step 2621).

When it is not YES in step 2619 (step 2619: NO), it is determined whether the document data stored in the storage section 108 is printed (which corresponds to the status "PC fax transmission" in FIG. 3) (step 2619). When it is YES (step 2621: YES), "send" is registered as an event (step 2621).

When it is not YES in step 2615 (step 2615: NO), it is determined whether the document data stored in the storage section 108 is printed (the recording section 202 of the multifunction machine 20 is used) (step 2623). When it is YES (step 2623: YES), "print" is registered as an event (step 2625).

When it is not YES in step 2623 (step 2623: NO), it is determined whether the HP is opened (step 2627). When it is YES (step 2627: YES), "open" is registered as an event (step 2629).

When it is not YES in step 2627 (step 2627: NO), it is determined whether the file or HP is closed, which corresponds to the file opening (step 2611) or the HP opening (step 2627) (step 2631). When it is YES (step 2631: YES), "close" is registered as an event (step 2629).

When it is not YES in step 2631 (step 2631: NO), the control section 100 waits until a file manipulation is performed again, after finishing the process of step 2609, 2613, 2617, 2621, 2625, 2629, or 2633.

Hitherto, the "document data" have been mainly exemplified in the description according to the first illustrative aspect however, the data as a target of the information management system 1 are not limited to the "document data", but the same details (processes) may be performed to, for example, "image data", "sound data", other data, or mixtures of the data.

Second Example

Hereinafter, an information management system different from the first illustrative aspect will be described specifically.

A second illustrative aspect of the invention is different from the first illustrative aspect, in that the "GID" used in the first illustrative aspect is not provided, that is, the "GID" is not defined in FIG. 3 and the "GID search condition setting process" is not performed in the during-activation intellectual assistance process and the manual intellectual assistance process. Therefore, the details of the same configuration and process order are omitted but only differences are described in the following description (since the process order in the manual intellectual assistance process is similar to the during-activation intellectual assistance process, the during-activation intellectual assistance process is substantially described in the second illustrative aspect).

(During-Activation Intellectual Assistance Process)

FIG. 31 is a diagram illustrating a flow of the during-activation intellectual assistance process.

When the during-activation intellectual assistance process is performed in step 711 of FIG. 7, the control section 100 of the PC 10 first reads the status ID, the destination address, and the target document address input (detected) by the external device from the RAM in step 709. The control section sets the data selected by the user through the operation section 104 as a search condition (step 2701), and performs the document search process (step 2703).

FIG. 13 is a diagram illustrating a flow of the document search process (step 2703). First, all the records in the status table 1081 and the document table 1083 are set to the initial values of the search result records (step 1301).

Next, in order to specify the target document associated with a specific record from the status table 1081, a search process is performed on the basis of the search condition selected in step 2703.

That is, in step 1303, it is determined whether the status ID is set as the search condition (step 1303). When it is YES (step 1303: YES), the record corresponding to the status ID set as the search condition in the status table 1081 is stored as the search result record (step 1305) and the process of step 1307 is performed. When the status ID is not set as the search condition (step 1303: NO), the process of step 1307 is performed without performing the process of step 1305.

In step 1307, it is determined whether the destination address is added as the search condition. When it is YES (step 1307: YES), the record corresponding to the destination address designated as the search condition among the search result records stored in step 1305 is stored as the search result record (step 1309) and then the process of step 1311 is performed. In step 1307, when the destination address is not added as the search condition (step 1307: NO), the process of step 1311 is performed without performing the process of step 1309.

In step 1311, it is determined whether the target document address is added as the search condition. When it is determined that the target document address is set (step 1311: YES), the record corresponding to the target document address designated as the search condition among the search result records stored in step 1305 and the like is stored as the search result record (step 1313) and then the process of step 1315 is performed. When it is determined in step 1311 that the target document address is not added as the search condition (step 1311: NO), the process of step 1315 is performed without performing the process of step 1313.

Here, the search result records obtained through the processes of steps 1303 to 1313 will be described in more detail.

When it is YES in steps 1303, 1307, and 1311, the final search result records comprise the records in the same status table 1081 as being stored in step 1313.

When it is YES in steps 1303 and 1307 and it is NO in step 1311, the final search result records comprise the records in the same status table 1081 as being stored in step 1309.

When it is YES in steps 1303 and 1311 and it is NO in step 1307, the final search result records comprise the records in the same status table 1081 as being stored in step 1313.

When it is YES in step 1303 and it is NO in steps 1307 and 1311, the final search result records comprise the records in the same status table 1081 as being stored in step 1305.

When it is NO in step 1303 and it is YES in steps 1307 and 1311, the final search result records comprise the records in the same status table 1081 as being stored in step 1313.

When it is NO in steps 1303 and 1311 and it is YES in step 1307, the final search result records comprise the records in the same status table 1081 as being stored in step 1309.

When it is NO in steps 1303 and 1307 and it is YES in step 1311, the final search result records comprise the records in the same status table 1081 as being stored in step 1313.

When it is NO in steps 1303, 1307 and 1311, the search result records comprise the records in the same status table 1081 as the status table 1081 set as an initial value in step 1301.

In step 1315, in order to perform the processes subsequent to step 1317, a non-processed search result record is read from the search result records specified in steps 1303 to 1313 and then the process of step 1317 is performed.

The processes after step 1317 are similar to those of the first illustrative aspect including the search result display process 2705, and thus details thereof are not described.

(Third Illustrative Aspect)

Hereinafter, an information management system different from those of the first illustrative aspect and the second illustrative aspect will be described specifically.

Only points different from the first illustrative aspect and the second illustrative aspect are described in the third illustrative aspect. Accordingly, the same configurations and processing order will be omitted in the following description.

(Document Search Process)

Figure 28:
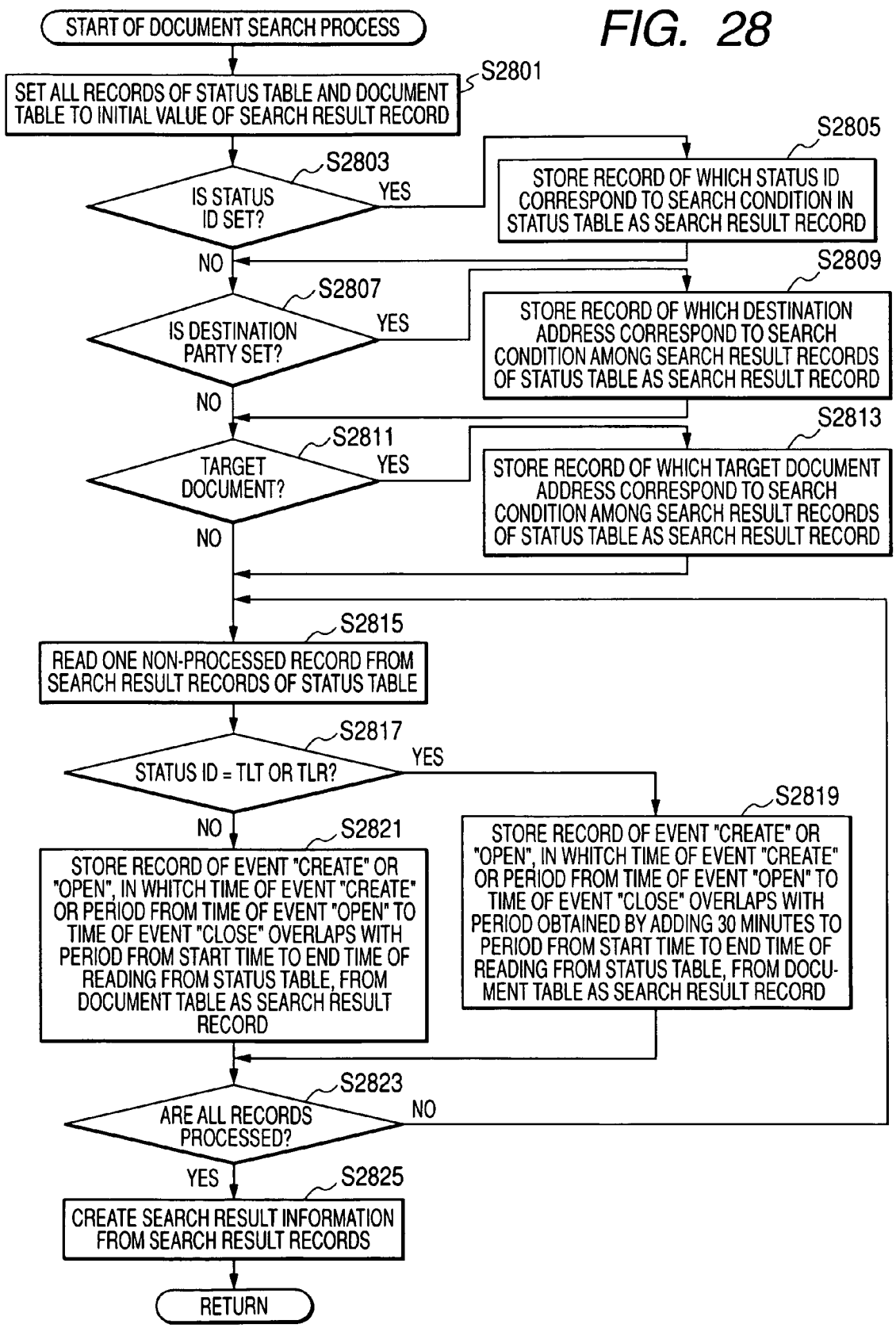
FIG. 28 is a diagram illustrating a flow of a document search process according to a third illustrative aspect of the invention

FIG. 28 is a diagram illustrating a flow of the document search process.

The processes of steps 2801 to 2815 are similar to the processes of steps 1301 to 1315 shown in FIG. 13 of the first illustrative aspect and thus description thereof will be omitted. The process of step 2817 and the processes subsequent thereto will be described in detail.

In step S1817, it is determined whether the status ID of the record read out in step 2815 indicates the telephone communication (for example, TLT or TLR). When it is determined that the status ID indicates the telephone communication (step 2817: NO), the process of step 2821 is performed.

The process of step 2821 and the processes subsequent thereto are similar to the process of step 1317 and the processes subsequent thereto shown in FIG. 13 of the first illustrative aspect, and thus description thereof will be omitted.

On the other hand, when it is determined in step 2817 that the status ID indicates the telephone communication (step 2817: YES), the process of step 2819 is performed.

In step 2819, in the records stored in the document table 1083 and set to the initial values of the search result records in step 2801, when a period from the time registered in the record having an event "create" or "open" to the time registered in the record having an event "close" and having the same document address as the document address of the record having an event "create" (that is, a period when it can be determined that the same document is "opened" or "treated" by the PC 10) overlaps with a period obtained by adding 30 minutes to the period from the start time to the end time of the record read out from the status table 1081 in step 2815, the record to be processed in the document table 1083 is stored as the search result record (step 2819).

That is, in the process (step 2819), a document determined to be treated during the telephone communication and within 30 minutes after the telephone communication ends is extracted.

Accordingly, when a document to be used as a reference of the communication details during the interactive communication is prepared after the interactive communication or a document obtained by arranging the communication details needs to be prepared and updated, the documents can be extracted as being correlated with the interactive communication.

The processes subsequent to step 2823 are similar to those subsequent to step 1319 shown in FIG. 13 in the first illustrative aspect, and thus the description thereof is omitted.

In the third illustrative aspect, by assuming that communication is performed up to 30 minutes from the actual communication end time by adding 30 minutes to the communication end time, the documents used during the communication and after the communication have been extracted. However, the added time is not limited to 30 minutes, but maybe 10 minutes or 60 minutes. Alternatively, the added time may not be necessary.

The added time may be set by a user or may be set in advance in the apparatus.

A time has been added to the communication end time, but a document used within a predetermined time before starting communication may be extracted.

In this case, the retroacting time may be set by a user or may be set in advance, similarly to the addition of time.

A document used at the time which retroacts by a time from the communication start time and is obtained by adding a time to the communication end time may be extracted.

The communication start time is not limited to the time when the communication starts, but may be a time when a destination telephone number is input, an off-hook time, or a time when an operation associated with the communication is performed.

Similarly, the communication end time is not limited to the time when the communication ends, but may be an on-hook time or a time when a phonic communication is lasted for a predetermined time.

What is claimed is:

1. An information management system comprising:
   a first external device having a first interactive communication unit capable of performing interactive communication and interchange of interactive communication partner information with a second external device having a second interactive communication unit through a telecommunication line;
   a first information processing device which is connected to the first external device in a communication-practicable manner and has a first output unit; and
   a third storage unit that stores utilization data which is accessed by the first information processing device,
   wherein the first information processing device comprises:
   a first detection unit that detects a first period in which interactive communication is performed by the first interactive communication unit, the interactive communication partner information, and interactive communication content data that are contents of the interactive communication;
   a storage control unit that stores the interactive communication content data detected by the first detection unit as the utilization data in the third storage unit;
   a first specification unit that specifies interactive-communication-content-data specifying information for specifying the interactive communication content data;
   a first storage unit that correlates and stores the first period, the interactive communication partner information detected by the first detection unit and the interactive-communication-content-data specifying information;
   a utilization unit that utilizes the utilization data stored in the third storage unit;
   a second detection unit that detects a second period in which the utilization data are utilized by the utilization unit;
   a second specification unit that specifies utilization-data specifying information for specifying the utilization data which are utilized in the second period;
   a second storage unit that correlates and stores the second period and the utilization-data specifying information;
   a correlation giving unit that gives a correlation to the utilization data specified by the utilization-data specifying information correlated with the second period and the interactive communication content data specified by the interactive-communication-content-data specifying information correlated with the first period with each other, when the first period and the second period have a period overlapping with each other;
   an extraction unit that extracts from the first storage unit the same interactive communication partner information as the interactive communication partner information detected by the first detection unit upon detection by the first detection unit; and
   an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device, and
   wherein the first external device comprises an offer unit that offers the first period, the interactive communication partner information, and the interactive communication content data in a manner that the first information processing device can detect, when the interactive communication is performed by the first interactive communication unit.

2. An information management system comprising:
   a first external device having a first interactive communication unit capable of performing interactive communication and interchange of interactive communication partner information with a second external device having a second interactive communication unit through a telecommunication line;
   a first information processing device which is connected to the first external device in a communication-practicable manner and has a first output unit; and
   a third storage unit that stores utilization data which is accessed by the first information processing device,
   wherein the first information processing device comprises:
   a first detection unit that detects a first period in which interactive communication is performed by the first interactive communication unit, the interactive communication partner information, and interactive communication content data that are contents of the interactive communication;
   a storage control unit that stores the interactive communication content data detected by the first detection unit as the utilization data in the third storage unit;
   a first specification unit that specifies interactive-communication-content-data specifying information for specifying the interactive communication content data;
   a first storage unit that correlates and stores the first period, the interactive communication partner information detected by the first detection unit and the interactive-communication-content-data specifying information;
   a utilization unit that utilizes the utilization data stored in the third storage unit;
   a second detection unit that detects a second period in which the utilization data are utilized by the utilization unit;
   a second specification unit that specifies utilization-data specifying information for specifying the utilization data which are utilized in the second period;
   a second storage unit that correlates and stores the second period and the utilization-data specifying information;
   a correlation giving unit that gives a correlation to the utilization data specified by the utilization-data specifying information correlated with the second period and the interactive communication content data specified by the interactive-communication-content-data specifying information correlated with the first period with each other, when a third period obtained by adding a predetermined period from the end of the first period to the first period overlaps with the second period;

an extraction unit that extracts from the first storage unit the same interactive communication partner information as the interactive communication partner information detected by the first detection unit upon detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device, and wherein the first external device comprises an offer unit that offers the first period, the interactive communication partner information, and the interactive communication content data in a manner that the first information processing device can detect, when the interactive communication is performed by the first interactive communication unit.

3. The information management system according to claim 1, wherein the second external device is connected to a second information processing device having a second output unit, which is capable of communicating with the first information processing device through the telecommunication line, in a communication-practicable manner, and wherein the output control unit of the first information processing device can output the utilization data to at least one of the first output unit, the first external device, the second external device, and the second output unit.

4. The information management system according to claim 2, wherein the second external device is connected to a second information processing device having a second output unit, which is capable of communicating with the first information processing device through the telecommunication line, in a communication-practicable manner, and wherein the output control unit of the first information processing device can output the utilization data to at least one of the first output unit, the first external device, the second external device, and the second output unit.

5. The information management system according to claim 1, wherein the output control unit of the first information processing device specifies the utilization data, outputs accessible address information to be selected and outputs the utilization data indicated by an address selected from the address information.

6. The information management system according to claim 2, wherein the output control unit of the first information processing device specifies the utilization data, outputs accessible address information to be selected and outputs the utilization data indicated by an address selected from the address information.

7. An information processing device which is connected to a first external device in a communication-practicable manner and which accesses a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that the information processing device can detect when the interactive communication is performed by the first interactive communication unit, the information processing device comprising:

a first detection unit that detects a first period in which interactive communication is performed by the first interactive communication unit, the interactive communication partner information, and interactive communication content data that are contents of the interactive communication;

a storage control unit that stores the interactive communication content data detected by the first detection unit as the utilization data in the third storage unit;

a first specification unit that specifies interactive-communication-content-data specifying information for specifying the interactive communication content data;

a first storage unit that correlates and stores the first period, the interactive communication partner information detected by the first detection unit and the interactive-communication-content-data specifying information;

a utilization unit that utilizes the utilization data stored in the third storage unit;

a second detection unit that detects a second period in which the utilization data are utilized by the utilization unit;

a second specification unit that specifies utilization-data specifying information for specifying the utilization data which are utilized in the second period;

a second storage unit that correlates and stores the second period and the utilization-data specifying information;

a correlation giving unit that gives a correlation to the utilization data specified by the utilization-data specifying information correlated with the second period and the interactive communication content data specified by the interactive-communication-content-data specifying information correlated with the first period with each other, when the first period and the second period have a period overlapping with each other;

an extraction unit that extracts from the first storage unit the same interactive communication partner information as the interactive communication partner information detected by the first detection unit on condition that detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device.

8. A non-transitory computer usable medium having computer readable instructions readable by a computer which is connected to a first external device in a communication-practicable manner and which accesses a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that a first information processing device can detect when the interactive communication is performed by the first interactive communication unit, the computer readable instructions enabling the computer to perform predetermined operations, the predetermined operations including the steps of:

detecting the first period in which interactive communication is performed by the first interactive communication unit, the interactive communication partner information, and the interactive communication content data that are contents of the interactive communication;

storing the detected interactive communication content data as the utilization data in the third storage unit;

specifying interactive-communication-content-data specifying information for specifying the interactive communication content data;

correlating and storing the first period, the detected interactive communication partner information and the interactive-communication-content-data specifying information;

utilizing the utilization data stored in the third storage unit;

detecting a second period in which the utilization data are utilized;

specifying utilization-data specifying information for specifying the utilization data which are utilized in the second period;

correlating and storing the second period and the utilization-data specifying information;

giving a correlation to the utilization data specified by the utilization-data specifying information correlated with the second period and the interactive communication content data specified by the interactive-communication-content-data specifying information correlated with the first period with each other, when the first period and the second period have a period overlapping with each other;

extracting the same interactive communication partner information as the interactive communication partner information; and outputting the interactive communication content data, which are specified by the interactive-communication-content-data specifying information correlated with the extracted interactive communication partner information, and the utilization data, to which a correlation is given with the interactive communication content data stored as the utilization data, to at least one of the first output unit, the first external device, and the second external device.

9. An information processing device which is connected to a first external device in a communication-practicable manner and which can access a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that the information processing device can detect when the interactive communication is performed by the first interactive communication unit, the information processing device comprising:

a first detection unit that detects a first period in which interactive communication is performed by the first interactive communication unit, the interactive communication partner information, and interactive communication content data that are contents of the interactive communication;

a storage control unit that stores the interactive communication content data detected by the first detection unit as the utilization data in the third storage unit;

a first specification unit that specifies interactive-communication-content-data specifying information for specifying the interactive communication content data;

a first storage unit that correlates and stores the first period, the interactive communication partner information detected by the first detection unit and the interactive-communication-content-data specifying information;

a utilization unit that utilizes the utilization data stored in the third storage unit;

a second detection unit that detects a second period in which the utilization data are utilized by the utilization unit;

a second specification unit that specifies utilization-data specifying information for specifying the utilization data which are utilized in the second period;

a second storage unit that correlates and stores the second period and the utilization-data specifying information;

a correlation giving unit that gives a correlation to the utilization data specified by the utilization-data specifying information correlated with the second period and the interactive communication content data specified by the interactive-communication-content-data specifying information correlated with the first period with each other, when a third period obtained by adding a predetermined period from the end of the first period to the first period overlaps with the second period;

an extraction unit that extracts from the first storage unit the same interactive communication partner information as the interactive communication partner information detected by the first detection unit upon detection by the first detection unit; and an output control unit that outputs the interactive communication content data, which are specified by the interactive-communication-content-data specifying information correlated with the interactive communication partner information extracted by the extraction unit, and the utilization data, to which a correlation is given with the interactive communication content data stored as the utilization data in the storage control unit, to at least one of the first output unit, the first external device, and the second external device.

10. A non-transitory computer usable medium having computer readable instructions readable by a computer which is connected to a first external device in a communication-practicable manner and which accesses a third storage unit that stores available utilization data, the first external device comprising a first interactive communication unit that performs interactive communication and interchange of interactive communication partner information with a second external device having a second interactive communication unit through a telecommunication line and an offer unit that offers a first period, the interactive communication partner information, and interactive communication content data in a manner that the information processing device can detect when the interactive communication is performed by the first interactive communication unit, the computer readable instructions enabling the computer to perform predetermined operations, the predetermined operations including the steps of:

detecting the first period in which interactive communication is performed by the first interactive communication unit, the interactive communication partner information, and the interactive communication content data that are contents of the interactive communication;

storing the detected interactive communication content data as the utilization data in the third storage unit;

specifying interactive-communication-content-data specifying information for specifying the interactive communication content data;

correlating and storing the first period, the detected interactive communication partner information and the interactive-communication-content-data specifying information;

utilizing the utilization data stored in the third storage unit;

detecting a second period in which the utilization data are utilized;

specifying utilization-data specifying information for specifying the utilization data which are utilized in the second period;

correlating and storing the second period and the utilization-data specifying information;

giving a correlation to the utilization data specified by the utilization-data specifying information correlated with the second period and the interactive communication content data specified by the interactive-communication-content-data specifying information correlated with the first period with each other, when a third period obtained by adding a predetermined period from the end of the first period to the first period overlaps with the second period;

extracting the same interactive communication partner information as the interactive communication partner information; and outputting the interactive communication content data, which are specified by the interactive-communication-content-data specifying information correlated with the extracted interactive communication partner information, and the utilization data, to which a correlation is given with the interactive communication content data stored as the utilization data, to at least one of the first output unit, the first external device, and the second external device.

* * * * *